US010810558B2

(12) United States Patent
Cacheria, III et al.

(10) Patent No.: US 10,810,558 B2
(45) Date of Patent: *Oct. 20, 2020

(54) SYSTEM FOR PROVIDING GOODS AND SERVICES BASED ON ACCRUED BUT UNPAID EARNINGS

(71) Applicant: GANART TECHNOLOGIES, INC., Carrollton, TX (US)

(72) Inventors: Anthony M. Cacheria, III, Coppell, TX (US); David Hooker, Forney, TX (US); Wayne Thomas McHugh, Lttle Elm, TX (US); Kristopher Glover, Dallas, TX (US); Webb Edwards, Lebanon, TX (US); Arthur Martin Holbrook, Carrollton, TX (US); Barrett Jenkins, Plano, TX (US); Purnendu Mishra, Frisco, TX (US); Mohamed Safir Salihu, Coppell, TX (US)

(73) Assignee: GANART TECHNOLOGIES, INC., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,046

(22) Filed: Apr. 22, 2019

(65) Prior Publication Data
US 2019/0251528 A1 Aug. 15, 2019

Related U.S. Application Data

(63) Continuation of application No. 16/105,415, filed on Aug. 20, 2018, now Pat. No. 10,268,992, which is a
(Continued)

(51) Int. Cl.
*G06Q 20/08* (2012.01)
*G06Q 20/04* (2012.01)
(Continued)

(52) U.S. Cl.
CPC ......... *G06Q 20/08* (2013.01); *G06Q 10/1057* (2013.01); *G06Q 20/04* (2013.01);
(Continued)

(58) Field of Classification Search
USPC .......................................................... 705/32
See application file for complete search history.

(56) References Cited

U.S. PATENT DOCUMENTS 8,463,669 B2 * 6/2013 Cacheria, III ..... G06Q 30/0601
705/32
8,751,338 B2 6/2014 Dombroski et al.
(Continued)

*Primary Examiner* — Garcia Ade

(57) ABSTRACT

A system for interfacing predetermined services to a user at a fixed location includes a processing platform running an operating system. Also included are a plurality of physical system resource interfaces for interfacing with available physical system resources. The physical system resources allow a user to gain access to the predetermined desired services. The system further includes a data store for storing configuration information for enabling the operating system to interface with the available physical system resources through the physical system resource interface associated therewith. A communication resource for interfacing with the operating system allows communication of the operating system with a central office for downloading configuration information to selectively enable ones of the available physical system resources to interface with the operating system through associated ones of the physical system resource interfaces in accordance with the configuration information and the predetermined service selected by a user. A plurality of configurations are stored in the data store, and each is associated with a predetermined service and one or more of the available physical system resources. Each physical system resource interface is uniquely associated with a defined one of the physical system resources.

18 Claims, 22 Drawing Sheets

Related U.S. Application Data continuation of application No. 13/915,387, filed on Jun. 11, 2013, now Pat. No. 10,055,716, which is a continuation of application No. 12/684,931, filed on Jan. 9, 2010, now Pat. No. 8,463,669.

(60) Provisional application No. 61/143,480, filed on Jan. 9, 2009, provisional application No. 61/265,028, filed on Nov. 30, 2009.

(51) Int. Cl.
*G06Q 20/06* (2012.01)
*G06Q 20/10* (2012.01)
*G06Q 20/18* (2012.01)
*G06Q 30/06* (2012.01)
*G06Q 40/00* (2012.01)
*G06Q 10/10* (2012.01)

(52) U.S. Cl.
CPC ......... *G06Q 20/042* (2013.01); *G06Q 20/065* (2013.01); *G06Q 20/10* (2013.01); *G06Q 20/105* (2013.01); *G06Q 20/1085* (2013.01); *G06Q 20/18* (2013.01); *G06Q 30/06* (2013.01); *G06Q 30/0601* (2013.01); *G06Q 40/125* (2013.12)

(56) References Cited

U.S. PATENT DOCUMENTS

| 2009/0132819 A1* | 5/2009 | Lu ........................ G06Q 20/352 713/169 |
| 2009/0192926 A1 | 7/2009 | Tarpata |
| 2010/0076790 A1* | 3/2010 | Benja-Athon ........ G06F 19/328 705/3 |

* cited by examiner

SYSTEM FOR PROVIDING GOODS AND SERVICES BASED ON ACCRUED BUT UNPAID EARNINGS

CROSS-REFERENCE TO RELATED APPLICATIONS

This application is a Continuation of U.S. patent application Ser. No. 16/105,415, filed on Aug. 20, 2018, entitled SYSTEM FOR PROVIDING GOODS AND SERVICES BASED ON ACCRUED BUT UNPAID EARNINGS, issuing as U.S. Pat. No. 10,268,992 on Apr. 23, 2019. U.S. application Ser. No. 16/105,415 is a Continuation of U.S. patent application Ser. No. 13/915,387, filed Jun. 11, 2013, entitled SYSTEM FOR PROVIDING GOODS AND SERVICES BASED ON ACCRUED BUT UNPAID EARNINGS, now issued as U.S. Pat. No. 10,055,716, issued on Aug. 21, 2018, which is a continuation of U.S. patent application Ser. No. 12/684,931, filed Jan. 9, 2010, entitled SYSTEM FOR PROVIDING GOODS AND SERVICES BASED ON ACCRUED BUT UNPAID EARNINGS, issued as U.S. Pat. No. 8,463,669, issued on Jun. 11, 2013, which claims benefit of U.S. Provisional Application Ser. No. 61/143,480, filed on Jan. 9, 2009, and entitled DISTRIBUTED TRANSACTION SYSTEM and U.S. Provisional Application Ser. No. 61/265,028, filed on Nov. 30, 2009, and entitled DISTRIBUTED TRANSACTION SYSTEM, the specifications of which are incorporated by reference herein in their entirety.

U.S. application Ser. No. 13/915,387 is related to U.S. application Ser. No. 12/684,927, filed on Jan. 9, 2010, and entitled DISTRIBUTED TRANSACTION SYSTEM, the specification of which is incorporated herein by reference.

U.S. application Ser. No. 13/915,387 is related to U.S. application Ser. No. 12/684,928, filed on Jan. 9, 2010, and entitled REMOTELY CONFIGURABLE USER DEVICE FOR ACCESSING A DISTRIBUTED TRANSACTION SYSTEM, the specification of which is incorporated herein by reference.

U.S. application Ser. No. 13/915,387 is related to U.S. application Ser. No. 12/684,929, filed on Jan. 9, 2010, and entitled REMOTELY CONFIGURABLE USER DEVICE WITH PHYSICAL USER RESOURCES AND INTERFACE, the specification of which is incorporated herein by reference.

U.S. application Ser. No. 13/915,387 is related to U.S. application Ser. No. 12/684,930, filed on Jan. 9, 2010, and entitled SYSTEM FOR PROVIDING TRANSACTION SERVICES TO A PLURALITY OF USER DEVICES, the specification of which is incorporated herein by reference.

U.S. application Ser. No. 13/915,387 is related to U.S. application Ser. No. 12/684,932, filed on Jan. 9, 2010, and entitled SYSTEM FOR PROVIDING GOODS AND SERVICES BASED ON ACCRUED BUT UNPAID EARNINGS, the specification of which is incorporated herein by reference.

TECHNICAL FIELD

The following disclosure relates to a system and method of distributed transaction services deployed on a plurality of terminals wherein the terminals may be dynamically reconfigured to provide different services.

BACKGROUND

The availability of self-service financial technology and devices such as automated teller machines, (ATMs), online banking and bill payment has grown rapidly in the recent past. However, the devices and systems used to conduct such financial transactions have typically been limited to a single service or services in a single financial arena. For example, conventional ATM machines are typically limited to cash withdrawals, deposits and balance inquiries. Self-service ticket machines are typically limited to dispensing tickets and require the use of a credit or debit card to complete a purchase. Current devices and systems also do not provide convenient, comprehensive financial services to unbanked and under-banked customers who may not have a bank account or a debit or credit card account. Some, however, do allow for multiple services from a common location, but each service has a dedicated VPN connection to the service provider.

Current ATM networks and similar services use standardized machines and processes that provide one or more services in the same manner regardless of where the machines are placed, who uses the machines, the frequency of transactions and other factors. However, an increasing number of different services are available, some of which may be more desirable to different segments of a population depending upon demographics, income levels, location and other factors. Thus, there exists a need for a system and method that can provide different services at different locations and times based upon predetermined factors.

SUMMARY

A system for providing access to system-subscribing employees of their accrued and unpaid earnings includes at least one employee access node (terminal) located in an employer facility. The employee access node may include physical resources such as one or more displays, touch screens, keyboards, biometric scanner, currency dispensers, printers and similar devices for interfacing with subscribing employees to transfer value on the behalf thereof. The employee access node may also include a transaction processor for facilitating transfer of value on behalf of the subscribing employees.

In one embodiment, a local server communicates with one or more employee access nodes to operate in conjunction therewith to facilitate value transfer transactions on behalf of subscribing employees. The local server may include a database with a list of subscribing employees and available accrued and unpaid earning for at least some of the subscribing employees. The local server may also include a local server transaction processor for interfacing with an employee access node to access the database to determine the available accrued and unpaid earnings for a given one of the subscribing employees, accessing the employee access node and transferring value on behalf of the given one of the subscribing employees and debiting the available and unpaid earnings of the given employee on the database.

BRIEF DESCRIPTION OF THE DRAWINGS

For a more complete understanding, reference is now made to the following description taken in conjunction with the accompanying Drawings in which.

DETAILED DESCRIPTION

Figure 1:
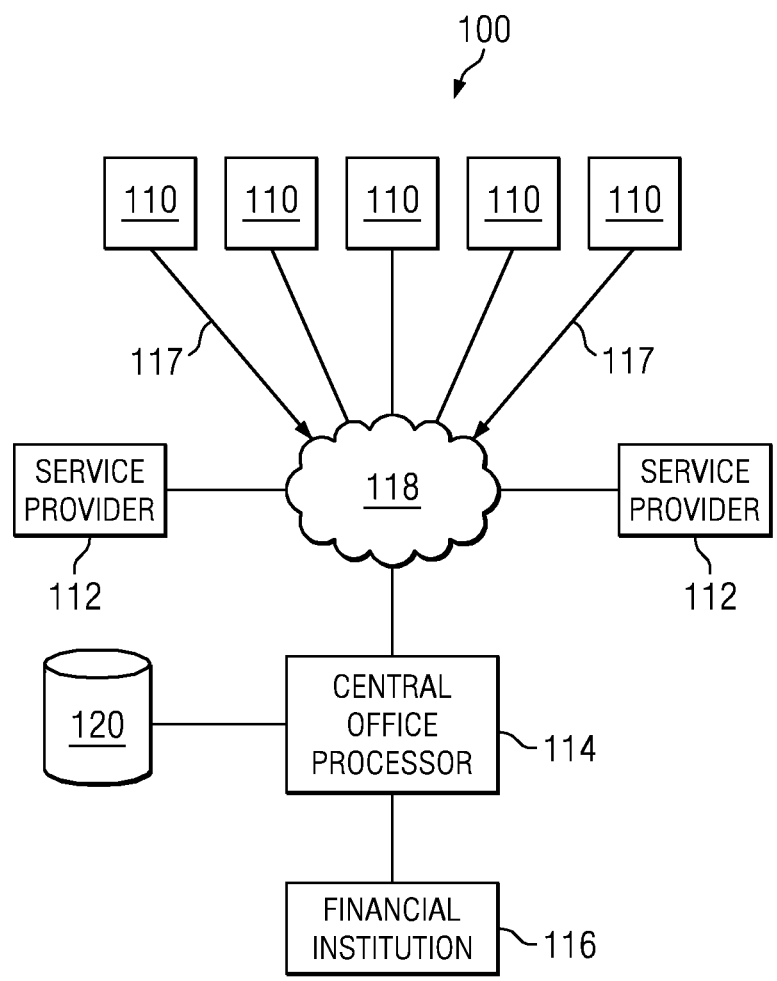
FIG. 1 is a block diagram of a distributed transaction system in one embodiment according to the disclosure.

Referring now to the drawings, wherein like reference numbers are used herein to designate like elements throughout, the various views and embodiments of a distributed transaction system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a block diagram of a distributed transaction system 100 also known as a Public Transaction System (PTS), e-Transaction System and/or an e-Public Transaction System. In one embodiment, system 100 includes a plurality of user terminals or kiosks 110. As set forth in greater detail herein, each of terminals 110 is dynamically configurable to provide different services at different locations and times depending upon a variety of factors. Thus, each of the terminals 110 may have a different "character" depending on the service modules (or external resources) available at the terminal 110. Terminals 110 are linked to a central office processor 114 via a data transmission interface represented by arrow 117 through a private or public network 118 such as the internet. In different variations, terminals 110 may be linked to the central office processor 114 by means of a local area network, a GSM connection or by means of the public telephone system (POTS). Central office processor 114 also interfaces with service providers 112 via network 118 which may be utilized to access and/or obtain service modules corresponding to the services offered by the different service providers.

Central office processor 114 may also interface with a variety of financial institutions 116, such as banks, credit card companies and other financial service providers. A data storage device 120 associated with central office processor 114 may include information regarding the configuration, (i.e. the identity of and the services enabled on different terminals 110) along with the information required to interface with service providers 112 and financial institutions 116. A user data base stored on storage device 120 may include user profiles with such information as age, gender, biometric parameter data such as a palm vein scan or fingerprint scan, the user's service history and other information. Additional data such as transaction data, logs, analysis data and results and performance data may also be stored on storage device 120.

As will be described more fully herein below, the system is a dynamic system which requires a strong interaction between each of the terminals 110 and the central office processor 114 in order to facilitate a transaction between a user and a service provider at one of the nodes 112. Each of the terminals 110 is configured as an independent interface to a particular user utilizing that particular terminal 110. Each of the terminals 110, as will be more fully described herein below, has associated therewith service modules or external resources that will allow the user to effectively interface with the service provider 112 to both input information to the system for use in the transaction and to receive an output from the transaction, if such is appropriate, this being a transaction dependent operation. During the transaction, there will be many interactions between the terminal 110 and the central office processor 114, this interaction allowing less of the transaction to be implemented on the terminal 110 and more to be implemented on the central office processor 114, such that more control is provided by the central office processor 114. Thus, it is not necessary to maintain any kind of database of profile information, for example, at terminal 110 but, rather, this can be maintained at the central office processor 114 such that global use thereof is provided to the different terminals 110 and, further, a higher level of security can be provided. As such, the terminal 110 could be considered to be somewhat of a "thin client" in that it merely needs to monitor its resources and provide control thereof and then interface with the central office processor 114 to implement and complete the transaction with the desired service provider 112. This will be described in more detail below.

Figure 2A:
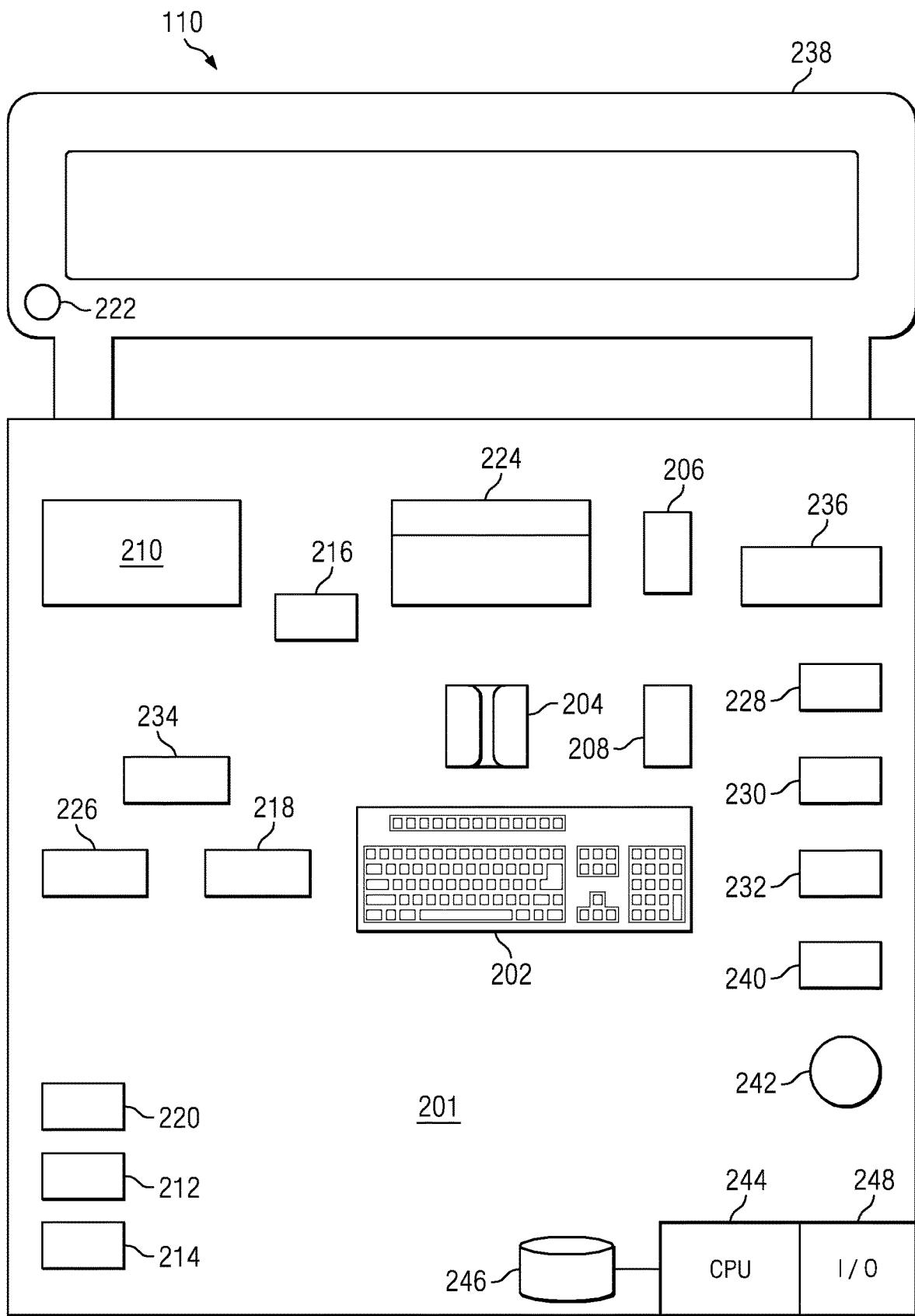
FIG. 2A is diagrammatic illustration of a terminal for use in the system of FIG. 1.
Figure 2B:
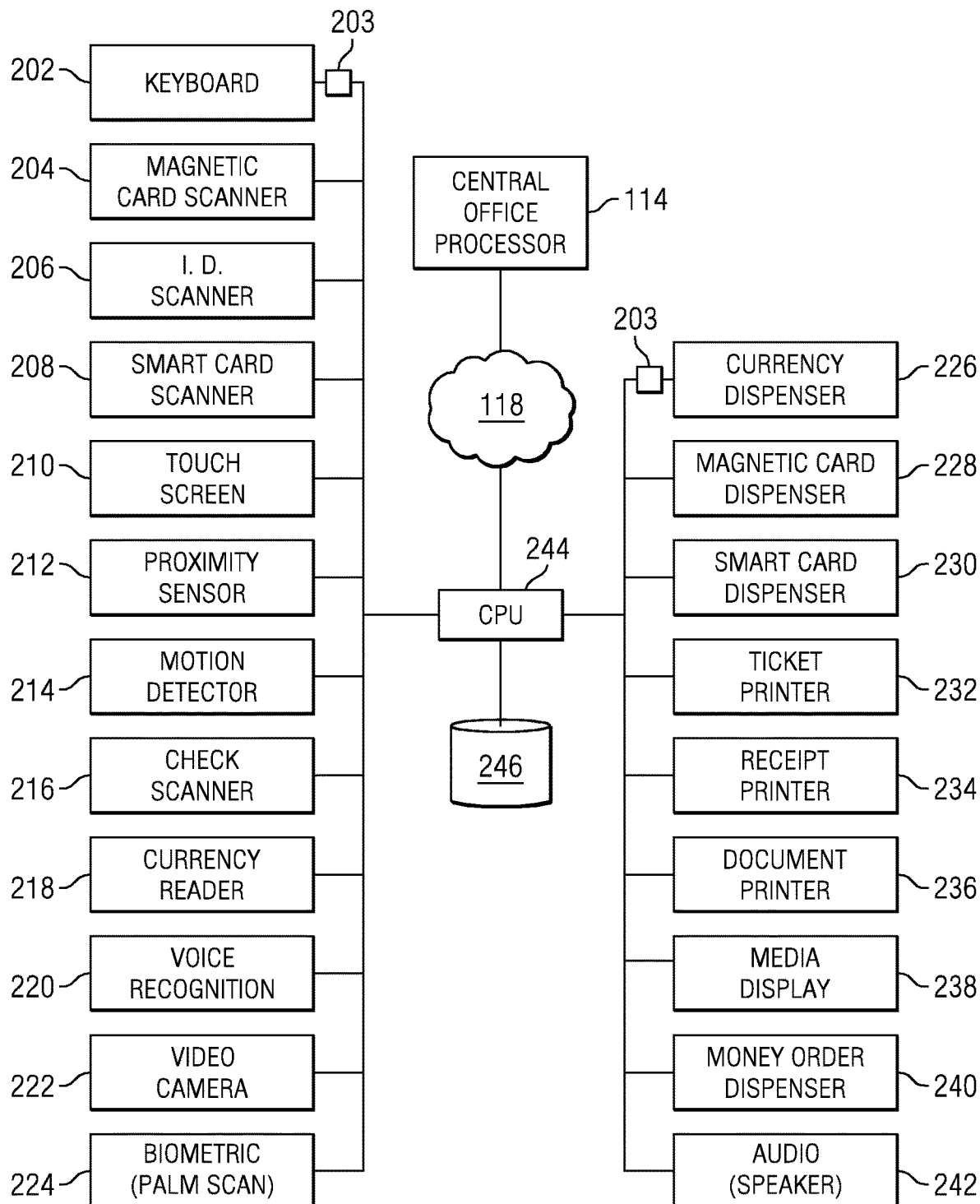
FIG. 2B is a block diagram illustrating one possible configuration for the terminal of FIG. 2A.

Referring to FIGS. 2A and 2B, each of terminals 110 is provided with a number of user interface devices (physical system or external resources) mounted in a housing 201 to allow a user to interface with the terminal 110. In one variation, the devices include a keyboard 202, a magnetic card scanner 204, an ID scanner 206, a smart card scanner 208 and a touch screen 210. Other user interface devices include a proximity sensor 212, a motion detector 214, a check scanner 216, a currency reader 218, a voice recognition model 220 and a video camera 222. Terminal 110 may also include a biometric parameter interface device such as a palm vein scanner 224 for authentication purposes. Each of the user interface devices may be connected to a CPU 244 (terminal processing unit) in terminal 110. Each of the interface devices may be interfaced with CPU 244 via a physical system resource interface 203 including hardware and software enabling the physical system resource to communicate with CPU 244.

Each of terminals 110 may also include a variety of output interface devices (also external resources) that enable the terminal to provide services to users. Such output devices may include a currency dispenser 226, a magnetic card dispenser 228, a smart card dispenser 230, ticket printers 232 and a receipt printer 234. In one embodiment, terminal 110 may also include a document printer 236, a media display device 238, a money order dispenser 240 and an audio output device such as a speaker 242. Referring specifically to FIG. 2A, in one variation, the media display device 238 may comprise a large, flat screen monitor for displaying promotional information such as advertisements for different goods and services. As illustrated, each of terminals 110 also includes a data storage device 246 (data store) associated with CPU 244. In one embodiment, CPU 244 interfaces with central office processor 114 via a public or private network 118 (communications resource).

Referring still to FIGS. 2A and 2B, in one embodiment each of devices 202-242 are independently controlled. Thus, if one of devices 202-242 fails, for example, if check scanner 216 jams, the individual device or module may be disabled along with the services that it supports without affecting the remaining modules and services. An operating system runs on CPU 244 (processing platform), which, among other function, monitors the status of available physical system or external resources via the physical system resources interfaces 203. In this manner, terminal 110 functions as a resources manager for managing available physical system or external resources. For example, if ticket printer 232 fails mechanically, the ticket printing services provided by terminal 110 may be disabled while the remaining services provided by the terminal are still available to users. In one embodiment, each of terminals 110 transmits a message to central office processor 114 at predetermined intervals with the status of each of devices 202-242. In the event that a service becomes unavailable due to a hardware failure or similar problem, the particular service may be "grayed out" on screen 210.

Figure 2C:
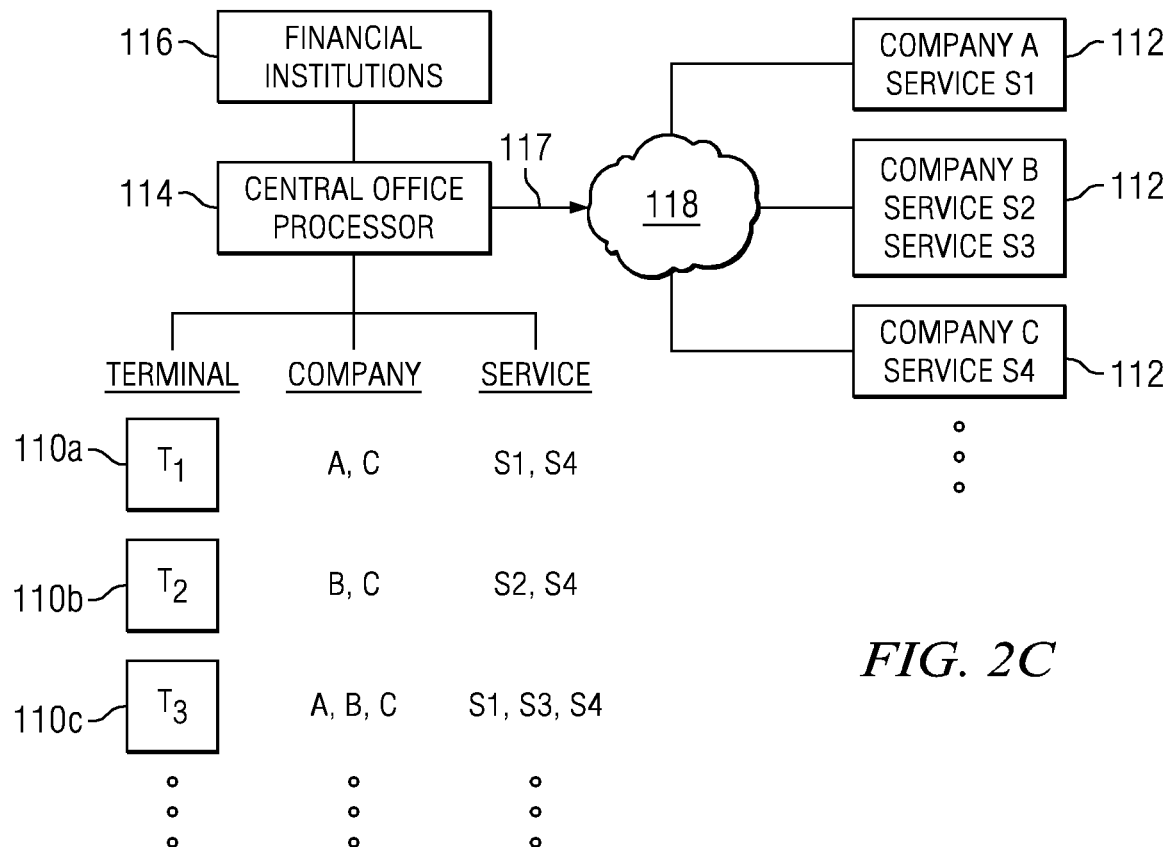
FIG. 2C is a block diagram illustrating the manner in which different terminals may be configured in one embodiment according to the disclosure.

FIG. 2C is a block diagram illustrating the manner in which different terminals 110 may be configured in system 100. Service providers 112 may provide a wide range of different services. Each of the service providers 112 may have configuration information associated with the provider and/or with a service of the provider. The configuration information (configuration) may include information defining the provider 112, and/or a service that the provider provides. The configuration may also include a "script," e.g., an instruction set defining a set of predetermined actions that are to be completed in a defined sequence to enable access to the service provider and/or service of the service provider. A configuration for a service provider 112 and/or for a service may be downloaded from the service provider to the central office processor 114 and, in turn, downloaded in whole or in part to selected ones of terminals 110 to enable a user to access the service provider of a provider service. The instructions incorporated in the script may be executed by the terminal 110 in conjunction with central office processor 114 to enable a user to access a user-selected service. A given configuration may identify the physical resources required to access a provider 112 and/or service. In many cases multiple configurations or scripts may require the same physical system resources for execution of an instruction set or script. In some embodiments, the operating system may disable access to a provider 112 or service if a required physical system resource is unavailable.

referring still to FIG. 2C, company A may provide service s1, company B may provide services s2 and s3 and company C may provide service s4. Such services may include providing tickets for different entertainment events, currency transfers and dispensing a variety of stored value cards such as debit cards, gift cards and telephone cards. However, some services may be more desirable to different population segments at different times due to factors such as demographics, cultural factors, income levels, holidays and the location of a specific terminal 110. Consequently, it may be desirable to configure different terminals 110 to provide different services at different locations or to configure a terminal based on a user profile. For example, as illustrated, terminal 110A may be configured with service modules to provide service s1 and s4 from companies A and C, respectively. Terminal 110B may be configured with service modules to provide services s2 and s4 from companies B and C. Terminal 110C may be configured with service modules to provide services s1, s3 and s4 from companies A, B and C, respectively.

As set forth in greater detail below, the configuration of services enabled on different terminals 110 in system 100 may be dynamically changed based on a number of factors such as service usage, transaction size or other factors. In one embodiment, terminals 110 are configured to transmit a "heartbeat" signal at predetermined intervals to central office processor 114 which may identify the service modules resident on the terminal and the status of hardware devices installed on the terminal. This is a "push" operation on the part of the terminal 110. In other embodiments, a "pull" type operation may be used at selected intervals. Upon receipt of the "heartbeat" signal, central office processor 114 may transmit additional service modules to terminal 110, enable or disable service modules resident on the terminal and/or associated hardware for implementing one or more of the service modules on the terminal.

With respect to the "heartbeat," this is a push operation wherein a given terminal 110 based on a predetermined interval will send out a communication to the central office. As noted herein above, the terminal 110 may be placed at any location in a city where sophisticated communication links are available or in a remote location where the sophistication of the communication links is questionable. Thus, a communication link to the central office processor 114 could be made through the Internet, a TC/IP connection/communication protocol, or a dial-up modem could be utilized, which would be a much slower data link. Once the data link has been defined, i.e., this being a hardware configuration that interfaces with a communication resource on the terminal 110, a session can begin. This session is begun by a request sent out by the terminal 110 to the central office processor 114 requesting a communication session. Once an acknowledgement is received from the central office processor 114, then data is transmitted to provide status information. Again, this status information indicates to the central office processor 114 the status of the particular configuration information that exists at the particular terminal 110 and the status of the various physical system or external resources. For example, if a printer had failed and this printer were required for a particular service, an indication would be provided that the printer had failed and that this service was no longer available. Of course, each of the terminals 110 has some type of ID associated therewith such that the central office processor 114 will recognize the terminal 110 as an authorized node on the network and would, of course, have information stored in a database local to the central office processor 114 that already has information regarding the configuration therefor. Thus, all that is really necessary is to provide status information of all of the resources or to provide just information as to what resource has failed. With this information, the central office processor 114 can then dispatch a service technician.

It should be understood that any type of communication protocol could be utilized in order to effect a communication between the two nodes. The type of communication be can any type of communication, i.e., status information, update information, etc. In the disclosed embodiment, the push operation is provided to transmit a minimal amount of information to the central office processor 114, as there may be many thousands of terminal units 110 associated with a network. Thus, the minimal amount of information may just be status information. Once a connection has been made through the heartbeat and a session started, it may be that the central office processor 114 can then download additional configuration information to reconfigure the terminal 110, if necessary. As one example, consider a situation where one of the services provided by a terminal processor is an ATM function. In this ATM function, one of the external resources that is associated with providing the service is a display. This display will display the owner of the ATM. This particular external resource is controlled by configuration information for the particular services, as will be described hereinbelow. If the ownership of the ATM service has changed, it might be that the owner of the service would want all of the terminal units that had the ATM function associated with this particular service provider changed to reflect the new owner in the "splash" page. This would require a modification of the configuration "script" that is associated with providing the service and it would then require the central office processor 114 to download to each of the terminal units 110 this information. This could be facilitated every time the "heartbeat" function is asserted by a particular terminal unit 110. Once the session is open, the session could remain opened and the configuration information in the form of the new ownership information downloaded. Since the heartbeat function occurs at regular intervals, the entire network of ATM units associated with the particular service provider could be updated in a very short period of time with a minimal amount of information being transmitted over the network.

Figure 2D:
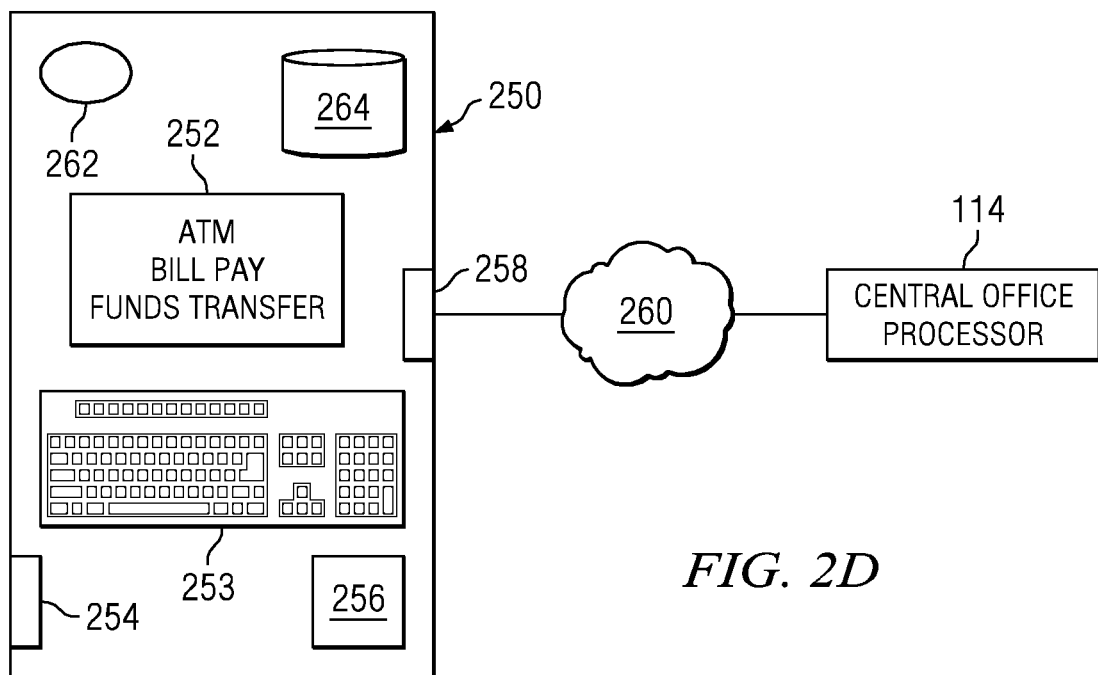
FIG. 2D is a schematic representation of a mobile terminal for use in the system of FIG. 1.

FIG. 2D is a schematic representation of a mobile terminal 250 that may be used to access central office processor 114 to provide services to customers. Mobile terminal 250 may be a tablet-sized device including a processor 262 and an associated data storage device 264. Mobile terminal 250 may be configured with a touch screen display 252, a keyboard 253, a printer 254, and a card reader 256. Mobile terminal 250 also includes a wireless data transmission interface 258 that provides a data transmission link via a public or private wireless network 260 with central office processor 114 (FIG. 1). Mobile terminal 250 may be dynamically configured with different service modules from central office processor 114 in order to provide different services based on factors such as service usage, transaction size or other factors as described below.

Mobile terminal 250 is particularly suited for use in locations where the location of a fixed location terminal 110 is impractical; for example, in rural areas where the majority of potential users or customers are unbanked for reasons such as lack of access to financial institutions, distrust in financial institutions, lack of communications infrastructure or other reasons. In this embodiment, a designated operator of mobile terminal 250 may accept currency from a customer and use the mobile terminal to pay the customer's bills, transfer funds, print receipts, coupons, money orders, tickets or similar documents. The designated operator of mobile terminal 250 may also use the terminal to receive a funds transfer on behalf of the customer. In this embodiment, the operator may disburse cash or currency to the customer upon confirmation of a funds transfer to a designated account on behalf of the customer.

Conventionally, the mobile terminal 250 could be a PDA (Personal Digital Assistant). Typically, these PDAs provide a processing function associated therewith, in addition to a phone function, that can run various applications. One of these applications could be a the local terminal application that allows the local terminal 250 to communicate with the central office processor 114. As noted hereinabove, there are a number of methods for communicating with the central office processor 114. One can be to use the data link associated with the internal phone modem, i.e., that associated with utilizing the data services of a particular PDA 250. However, most of the PDAs or local terminals 250 will have associated therewith an 802.11 communication link that uses a wireless access protocol (WAP) that can interface with a local wireless hub that is connected to a network such as the Internet through TCP/IP protocol. This would allow the local terminal 250 to access other units such as the central office processor 114. It should be understand that this could be an intermediate control processor that could be accessed by the local terminal 250. Further, it could be that the local terminal 250 is merely an extension of one of the terminals 110, such that the local terminal 250 actually constitutes an external resource of the terminal 110.

Another application that could be implemented on a mobile terminal, requiring only a display, is that associated with a money transfer operation either from the individual utilizing the mobile terminal 250 to obtain some value in the form of cash or to transfer this to someone else. To facilitate such a transaction, the mobile terminal 250 will be utilized to identify the user, i.e., to provide some type of identification in the form of a user ID PIN number. Further, some type of biometric input, such as the biometric input 257, could be utilized to provide a fingerprint input for a user. Thus, the mobile terminal 250 could be utilized to authenticate a particular user. Once authenticated while running the application, the application would then, for example, allow access to a financial institution to "withdraw" cash. This withdrawal would be in the form of a provided code. This code would be provided to the user on the display 252, which could then be utilized to complete a transaction. This transaction that could be completed would be to go to a terminal 110 having a cash dispenser or some other cash dispenser that would recognize this code to dispense cash to that individual. Further, this code could be a code that could be transmitted to a relative in a remote location to use another terminal to obtain the cash in either U.S. currency or in any foreign currency. By utilizing the local terminal 250, all of the functionality of the terminal 110 or a portion of that functionality could be implemented in the mobile terminal 250.

Figure 2E:
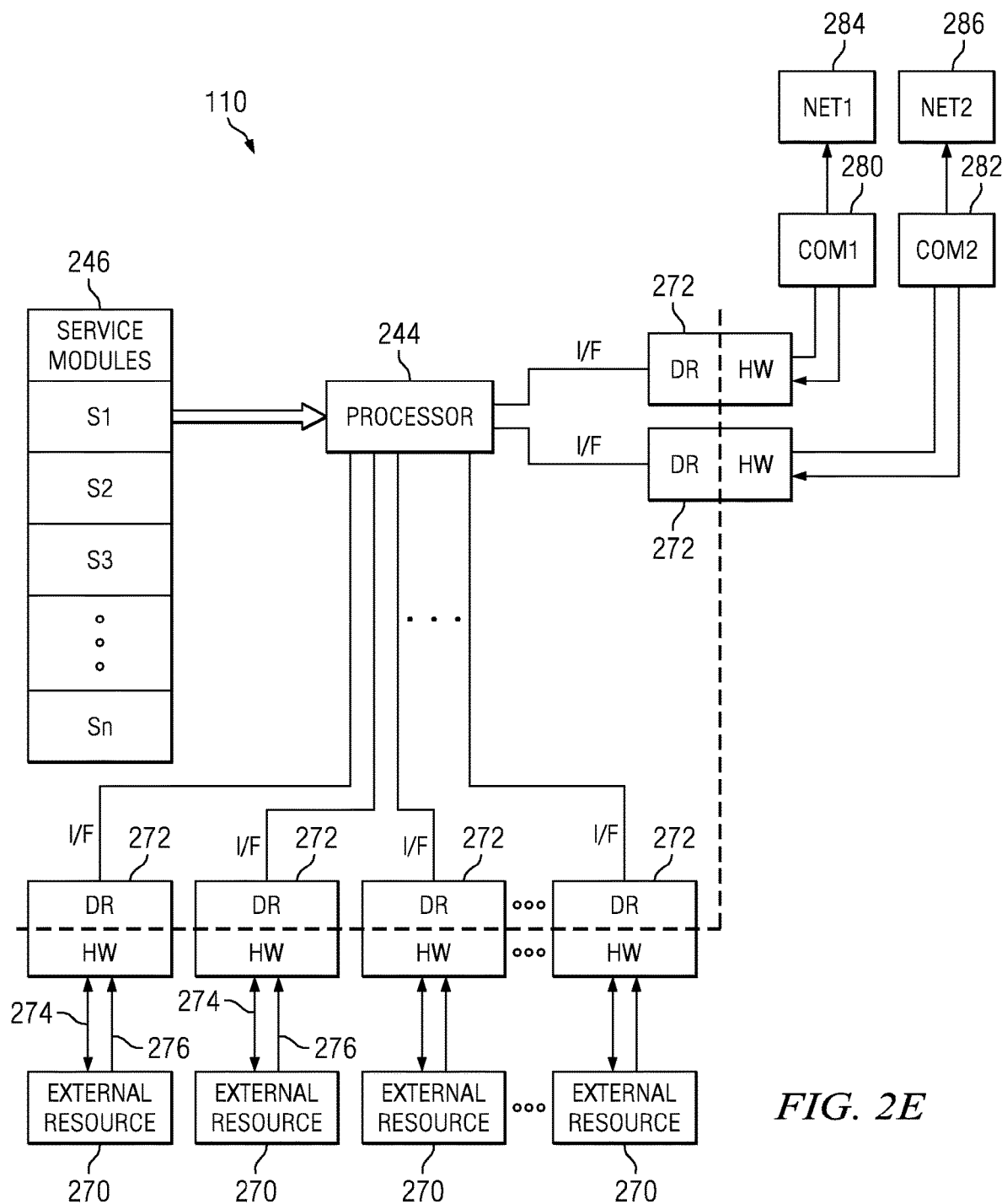
FIG. 2E illustrates a diagrammatic view of the terminal.

Referring now to FIG. 2E, there is illustrated a more detailed diagram of the terminal 110 and the manner by which it interfaces with the various physical system or external resources. There is illustrated the processor 244, which is operable to interface with a plurality of external resources 270, which, as described hereinabove, can be any type of hardware resource that allows a user to interface with the various service providers through the central office. In general, the terminal 110 does not possess the capability to allow a user to interface with any kind of service to conduct a financial transaction without being connected to the central office. This is not to say that such could not be implemented. However, for example, if a user were provided a code that could be input to a terminal 110 through the keypad (one of the external resources 270), this would allow the user to retrieve cash from a cash dispenser (another one of the external resources 270). However, if the terminal 110 did not interface with the central office or the service provider through the central office processor 114, then that would require the terminal 110 to have associated therewith all of the information necessary to authorize a particular user on that terminal 110 in addition to preprocessed information about an already in process financial transaction. This would mean that all of the terminals 110 would be required to have all of that information. This is not practical for most financial transactions. These are not pay-as-you go type terminals that would allow a user to input value and receive value therefrom with a percentage of the input value retained as a fee and maintained in the system independent of the operation of any external processing system.

The processor 244 has associated therewith a light operating system that provides the basic operating parameters to interface with the central office, interface with the storage database 246 containing the various service modules, and also interface with the physical system or external resources 270. In order to interface with the external resources 270, there is provided a hardware interface 272 associated with each external resource 270. This external resource basically is a physical terminal or connector that can receive a connection or cable from the external resource 270 and this will typically allow bi-directional communication. Data can be transmitted to the external resource 270 for a printer, for example, and information can received back from that printer indicating an error. Therefore, there will always be some type of monitor function associated with a particular external resource 270 in addition to a data transfer path. The data transfer path is illustration by a path 274 and the monitoring information is represented by a path 276. Any type of well-known connection can be used to provide this. In recent years, most external resources in the form of printers, keyboards, and the such, utilized a conventional communication link such as a serial USB connection. These USB interfaces utilize a common driver interface such that plugging the USB cord from the external resource 270 into the hardware interface will allow the processor 244 to recognize the device and essentially identify that device. Further, after the hardware interface has been provided, there will then be some type of driver software that will be required for the processor 244 to effect an interface with the external resource 270. Even though the hardware interface may be a USB interface or some proprietary interface, there still must be some type of driver software to allow communication with the external resource. For example, a printer may be recognized as a particular printer through a USB interface or other type of serial or parallel port interface, but driver software is required in order to utilize the full functionality of that particular external printer or other external resource. If the external resource 270 were a display, then a particular cable or interface such as a VGA cable would be required to interface with the display. Appropriate drivers would be required for the display. Sometimes, the operating system itself has predefined drivers for displays, as these are somewhat universal. For some resources, however, special drivers would be required to utilize the full functionality of that particular resource.

The processor 244 then manages the resources 270 by keeping a table of available resources. If a resource fails, this will be communicated through the hardware interface to the processor 244 and may, in fact, require the use of the driver software to interface with the external resource 270 to provide this monitoring function. If the resource fails or if it is not connected, this would be recognized by the processor 244. For example, when a particular configuration is provided, it may require a cash dispenser, a keyboard input and a display output in addition to a biometric scanner. The particular software script that comprises part of the service module will require all of these resources in order to function. Therefore, there will be a list of available resources that must exist in order for a particular terminal 110 to constitute a fully operating terminal for that service in accordance with the configuration information provide by the central office processor 114. If one of these resources disappears, this will disable a particular service module and this will be communicated back to the central office processor 114 during the "heartbeat."

The storage region 246 will be the area where the various service modules "script" is stored. This is the sequence of instructions that must be carried out in order to effect the portion of the transactions that is associated with a particular terminal 110. For example, one of the first transaction that will occur and that constitutes a service module is an authorization module. This authorization module will require authentication of an individual by requiring them to enter certain information, such as name, password, PIN information, and even biometric data. This will be utilized to authenticate the individual at the central office processor 114, after which the user will then be presented a display of the available services that can be used or, more likely, the services will first be provided in a "greyed-out" format to the user and these then, upon authentication, will be un-greyed-out so that the user knows they now have access, i.e., they have been authenticated. After that, the user then can select one of the service modules and, upon selection thereof, the service module will sequentially access the various external resources to effect the transaction in conjunction with the central office processor 114, as will be disclosed hereinbelow. Thus, each of the service modules s1, s2, s3 . . . sn will be stored therein, which each constitute a portion of the script or transaction process required to be executed by the terminal 110 for a particular service. This is the configuration information that is downloaded from the central office processor 114. However, it should also be understood that a particular terminal 110 could have all of the service modules fully loaded therein and all that the central office processor 114 would be required to do would be to activate a particular service on a terminal 110.

Two of the resource interfaces 272 are illustrated as being associated with communication external resources, one being an external resource 280 labeled COM1 and a second one 282 labeled COM2. Each of these are interfaced with separate networks 284 and 286, respectively. For example, one communication protocol could be a dial-up modem and the other could be an Ethernet card. Either of these can interface a separate and different network utilizing a separate and different protocol. Both, alternatively, could be the same hardware resource for a redundancy purposes. This resource allows the processor 244 to communicate with the central office processor 114.

Figure 3:
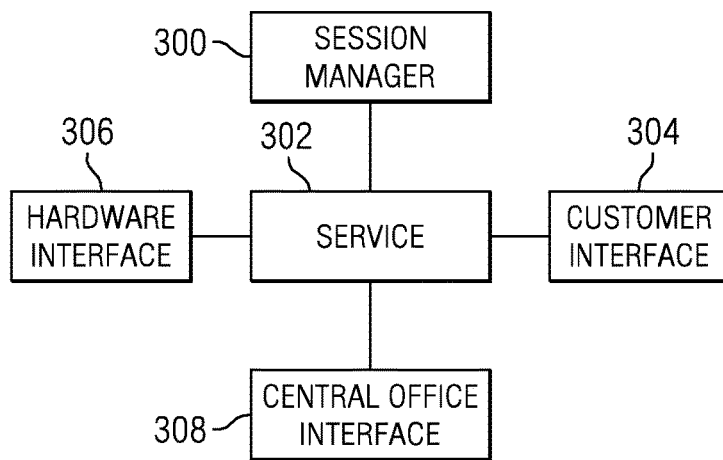
FIG. 3 is a block diagram illustrating the management of terminals to provide services to users.

FIG. 3 is a block diagram illustrating the management of terminals 110, 250 to provide services to users. A session manager module 300 resident on terminal 110 manages service modules 302. Each of service modules 302 is associated with a service such as cash withdrawal or advance, check cashing, providing tickets or another service. A customer or user interface 304 associated with each of service modules 302 enables a user to enter or input the information required to utilize the desired service. Each of service modules 302 also has an associated hardware interface 306 that allows the service module to communicate with the devices necessary to collect information and provide the desired service. Such devices may include biometric parameter scanners, keyboards, touch screen GUIs, printers for printing receipts, coupons and tickets, card dispensers, currency acceptors, currency dispensers and similar devices. Service module 302 may also include a central office interface 308 enabling the service module to communicate with the central office processor 114.

Figure 4A:
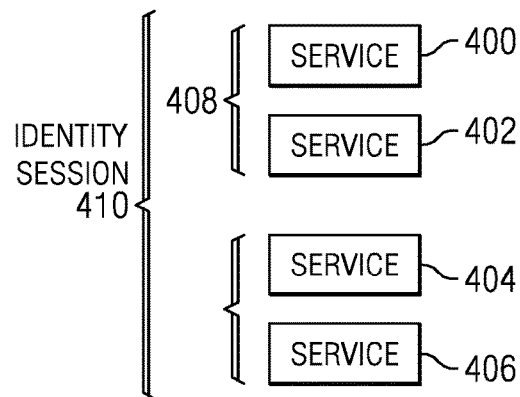
FIG. 4A is a block diagram illustrating a possible user session with the system of FIG. 1.

FIG. 4A is a block diagram illustrating a possible user session. If a selected service requires user identification and/or authentication, as hereinafter described, an identity session 410 is opened by session manager module 300. Next, a transaction session 408 may be opened in which one or more services 400-406 may be used in a transaction. The transaction session 408 typically begins with the user providing or receiving value in connection with a service 400. In different variations, the value may be in the form of currency, a credit or debit card transaction, a check or money order. For example, service 400 may include the receipt of value in the form of currency entered by a user of terminal 110. Service 402 may comprise, for example, a bill payment service by which the user pays his or her telephone bill with the value entered at 400. Transaction session 408 ends when no value remains or when any remaining value is returned to the user. For some transactions, for example, a cash withdrawal where the user simply swipes a card and enters a PIN, authentication may not be required and an identity session 410 will not be created. During a given transaction session, session manager 300 tracks value received and dispensed by means of terminal 110.

Figure 4B:
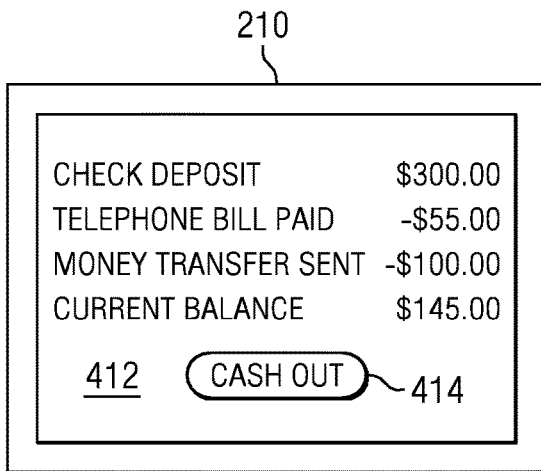
FIG. 4B is a an exemplary screen display of a virtual ticker or receipt.
Figure 4C:
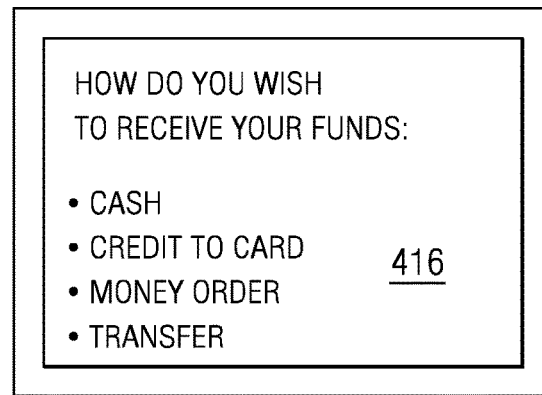
FIG. 4C is an exemplary screen display for selecting a method of disbursing funds.

Turning to FIG. 4B, in one embodiment terminal 110 displays the current session value as transactions are conducted using the terminal. In one variation, the transactions and session value may be displayed using touch screen 210 of FIG. 2A. In other embodiments, a separate dedicated graphical user interface may be employed to display transactions and the session value. As value is added or removed during the session, a screen display 412 consisting of a virtual ticker or receipt may be displayed including the transactions and current session value. For example, in the illustrated example, a user begins a session with a check deposit ($300.00). The user then pays a bill such as a telephone or other utility bill ($55.00). The user may also transfer funds ($100.00), leaving the user with a session value or balance ($145.00). The user may then terminate the session and receive the remaining session value by pressing an icon or "button" 414 included in the screen display. After a user presses button 414, a screen display 416 (FIG. 4C) may be presented to the user prompting the user to select the form in which the remaining session value is to dispensed, i.e. cash, a credit to a debit card, a money order or a transfer of the remaining session value to an account of the user at a financial institution. The user may then select the manner in which he or she wishes to receive the remaining session value after which the session is terminated.

Figure 5:
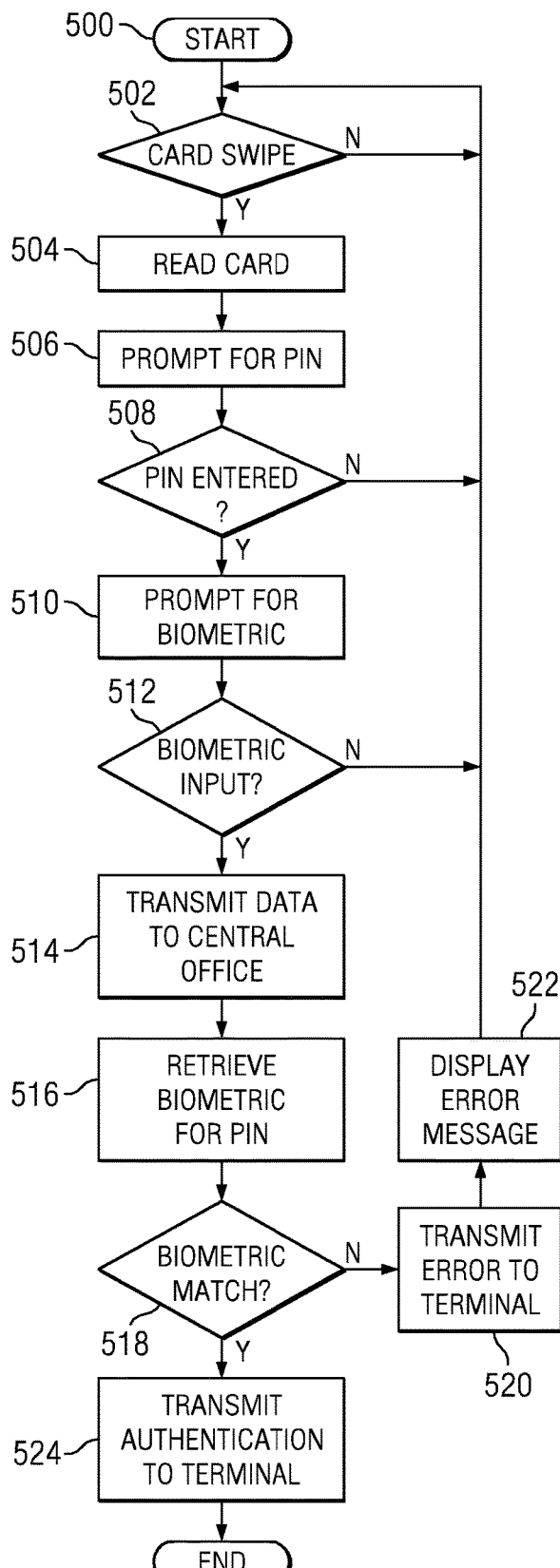
FIG. 5 illustrates a flowchart of one method of authentication used in a system according to the disclosure.

FIG. 5 is a flowchart of one method of authentication used in system 100. The process begins at step 500, which may include sensing the presence of a user at terminal 110 by means of a motion detector, proximity sensor or similar device. At step 502, terminal 110 detects a card swipe. The card may be a credit card, a stored value card such as a debit card or an identity card. The card is read at step 504 and the user is prompted to enter a personal identification number (PIN) at step 506. If a PIN is not entered at step 508, the process returns to Start. If a PIN is entered, the user is prompted to enter a biometric parameter at step 510. The biometric parameter may be a palm vein scan, a fingerprint scan, a retinal scan or other unique biometric parameter associated with the user.

If a biometric parameter input is not detected, at step 512 the process returns to Start. If a biometric parameter input is entered, the collected data including information entered at the card swipe, the PIN number and the biometric parameter are transmitted to the central office processor 114 at step 514. At step 516, central processor 114 uses the user's PIN to retrieve a biometric parameter associated with the user's PIN from a user database on data storage device 120 (FIG. 1). In some variations, the user database may be resident on terminal 110 or the biometric parameter may be obtained from a service provider or financial institution. At step 518, the biometric parameter transmitted from terminal 110 is compared to the stored biometric parameter. If the transmitted biometric parameter does not match the stored biometric parameter an error message is transmitted to terminal 110 at step 520 and an error message is displayed at step 522 on the terminal. If the transmitted and stored biometric parameters match, central office processor 114 transmits an authentication message to terminal 110 and the authentication process is completed (step 524).

It will be appreciated that for some transactions, a card swipe may not be necessary. In those instances, a combination of a PIN number and a biometric parameter may be sufficient to identify and authenticate a user of terminal 110. It will also be appreciated that the combination of a PIN number with a biometric parameter enables central office processor 114 to compare a transmitted biometric parameter to a stored biometric parameter without searching an entire database of such parameters. In the case of some transactions, the combination of a card swipe with the input of a valid PIN may be sufficient to enable a user to access a selected service. In yet other embodiments, a biometric parameter may be stored on a user ID card. In this case, the parameter may be retrieved during or after a card swipe and compared to a corresponding parameter obtained from the user at the time of the transaction.

It will be appreciated that the terminal 110 is designed to be a "thin client," which will result in a minimal amount of information being stored at the terminal 110. This may be for the purpose of security such that no confidential information is stored thereat in the form of biometric or profile information of subscriber/users or other confidential information. Further, since there will be a plurality of terminals 110 for a given central office processor 114, is undesirable to store user information at a particular terminal 110. However, it is possible that certain users may frequently use a particular terminal 110. In this event, there may be a most recently used database contained thereat, which allows the biometric information to remain stored in a local database for a short period of time. If it is not reused within a short period of time, it is deleted and, if it is used within that short period of time, it will be "strengthened" or refreshed in the database such that it will remain in the database for a longer period of time. This facilitates the speed of authentication.

Figure 6:
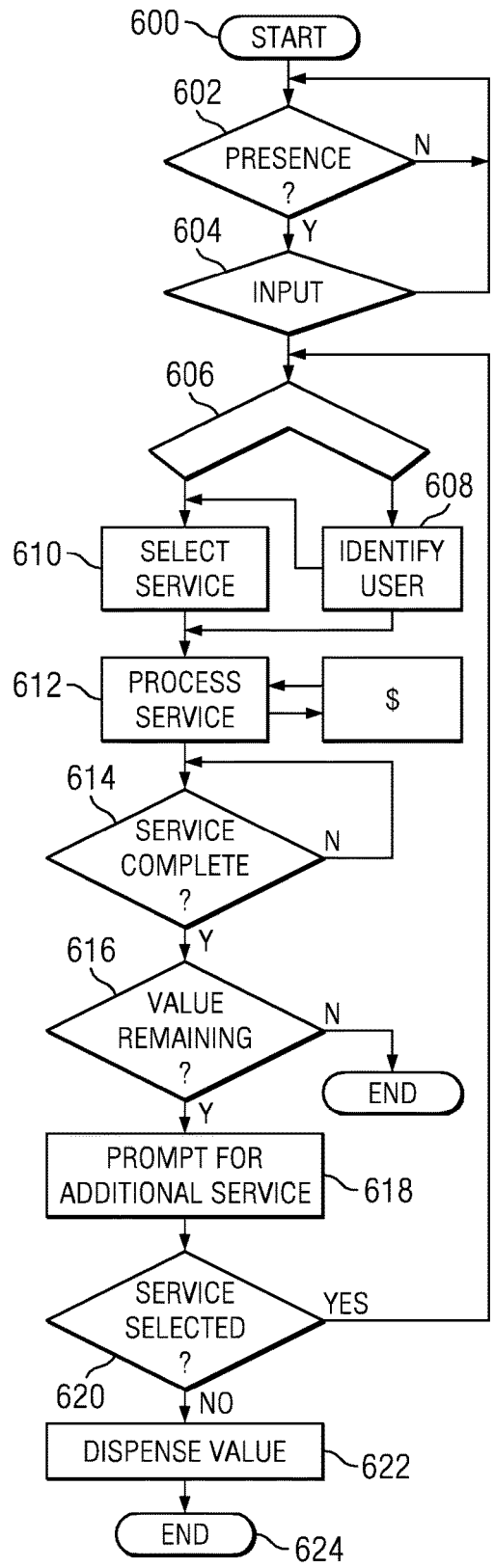
FIG. 6 is a flowchart illustrating a process of providing a user with a service employing a system according to the disclosure.

FIG. 6 is a flowchart illustrating a process of providing a user with a service employing a system according to the disclosure. The process begins at step 600, and at step 602 the presence of a user at terminal 110 is detected. In some embodiments, the step of detecting the presence of an individual at the terminal may be omitted. At step 604, terminal 110 receives an input. The input may be a card swipe, a biometric parameter or a user entry made via a keyboard or touch screen. If the presence of a user is not detected at step 602, or if no input is received at step 604, the process returns to the starting point. Based on the input received at step 604, a determination is made at step 606 as to whether the user needs to be identified and/or authenticated. If identification or authentication is required for the transaction, the user is identified or authenticated at step 608 as previously described.

At step 610, the user selects the desired service. In some cases, it may not be necessary to identify or authenticate the user. For example, if the user is purchasing a ticket or money order with currency, identification and/or authentication for the transaction may not be required. At step 612, the service is processed and value is exchanged. The exchanged value may be in the form of a debit or credit to a credit card or other stored value card or the user may receive or input currency into terminal 110 by means of a currency dispenser or reader. As an example, any type of exchange with a credit card that does not require identification, consider the use of a credit card where the credit card company merely requires a scan of the credit card and does not require the user to input any kind of PIN or code from the back of the card. Credit card companies have realized that the ease of using a credit card without requiring a signature or any type of user input information significantly simplifies the process resulting in more income to the credit card company. The credit card companies have determined that the risk for small transactions, such as buying a ticket, entail little or not risk to the credit card company of not collecting that money. Thus, just swiping a credit card with no authentication whatsoever can be an aspect of the financial transaction and can constitute an authentication.

At step 614, a determination is made as to whether the service has been completed. If the service has been completed, the user's balance is checked to determine whether he or she has any value remaining in the transaction. As previously noted, session manger module 300 of FIG. 3 tracks the user's balance during the transaction. For example, if the user entered a $20 bill into terminal 110 to pay a $17 outstanding balance on a telephone bill, the user would still have a balance of $3 of value remaining. If the user has no value remaining, the process ends. If the user still has value remaining, he or she is prompted to determine whether an additional service is desired at step 618. If an additional service is desired, the process returns to step 606. If another service is not desired, the terminal 110 dispenses value in an amount equal to any remaining balance at step 622 and the process ends at step 624.

Figure 7:
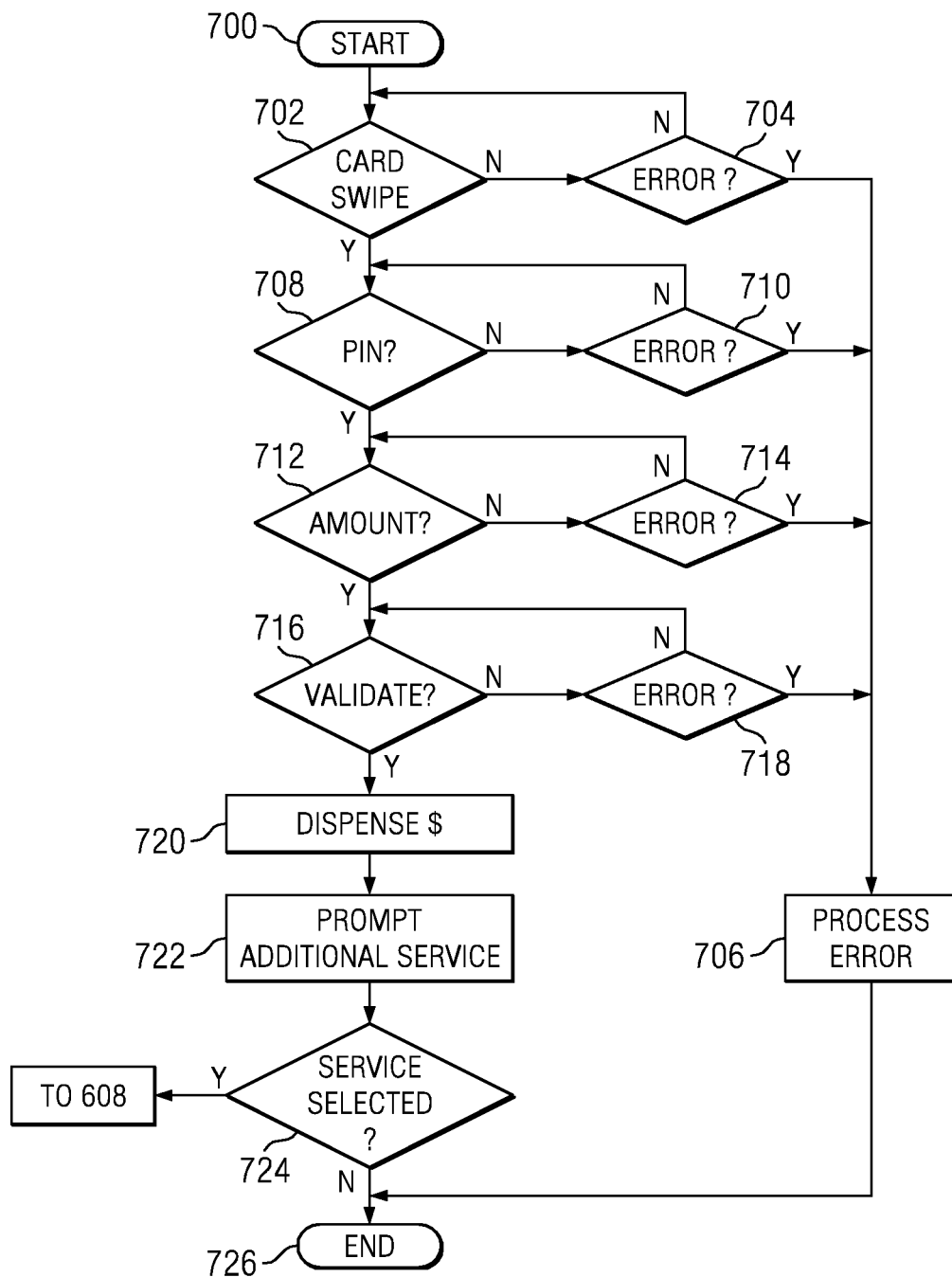
FIG. 7 is a flowchart illustrating an ATM transaction according to the disclosure.

FIG. 7 is a flowchart illustrating an ATM transaction using terminal 110. The process may begin at step 700 where the presence of a user may be detected by means of a motion sensor or proximity sensor or similar device. At step 702, a card swipe is detected. The card may be a credit card, debit card or other stored value card. If a card swipe is not detected, an error determination is made at step 704. If a process error is detected, for example, if the card reader is not operable, a process error message may be sent to central office processor 114 at step 706 and the transaction is terminated. At step 708, the user is prompted to enter a PIN number. If a PIN number is not detected, an error check is made at step 710. If a process error is detected, an error message to central office processor 114 may be sent at step 706. If a PIN number is received, the user is prompted to enter an amount at step 712. Again, if an amount is not entered, an error check is made at step 714 and if a process error is detected, the process loops back to step 706 where a process error message is transmitted to the central office processor 114.

At step 716, the collected data is validated. The validation process will include transmission of the collected information to central office processor 114, which will in turn validate the transaction with the user's selected financial institution. In some instances, a user biometric parameter may also be required to validate the user. If the information or data cannot be validated, an error check is made at step 718 and if a process error is detected, the process loops back to step 706 where an error message is generated. In one embodiment, if a process error is detected at any one of the preceding steps, the service software module and the associated user interfaces and/or hardware may be taken out of service by the central office processor 114 and/or by the session manager model 300 of FIG. 3.

Assuming that the transaction is validated at step 716, value, for example currency, is dispensed to the user at step 720. In other embodiments, a stored value card may be dispensed or the balance associated with the card increased. The user is then prompted to determine whether an additional service is desired at step 722. If an additional service is desired, the process loops back to step 608 of FIG. 6. If not, the transaction is completed at step 726.

Figure 7A:
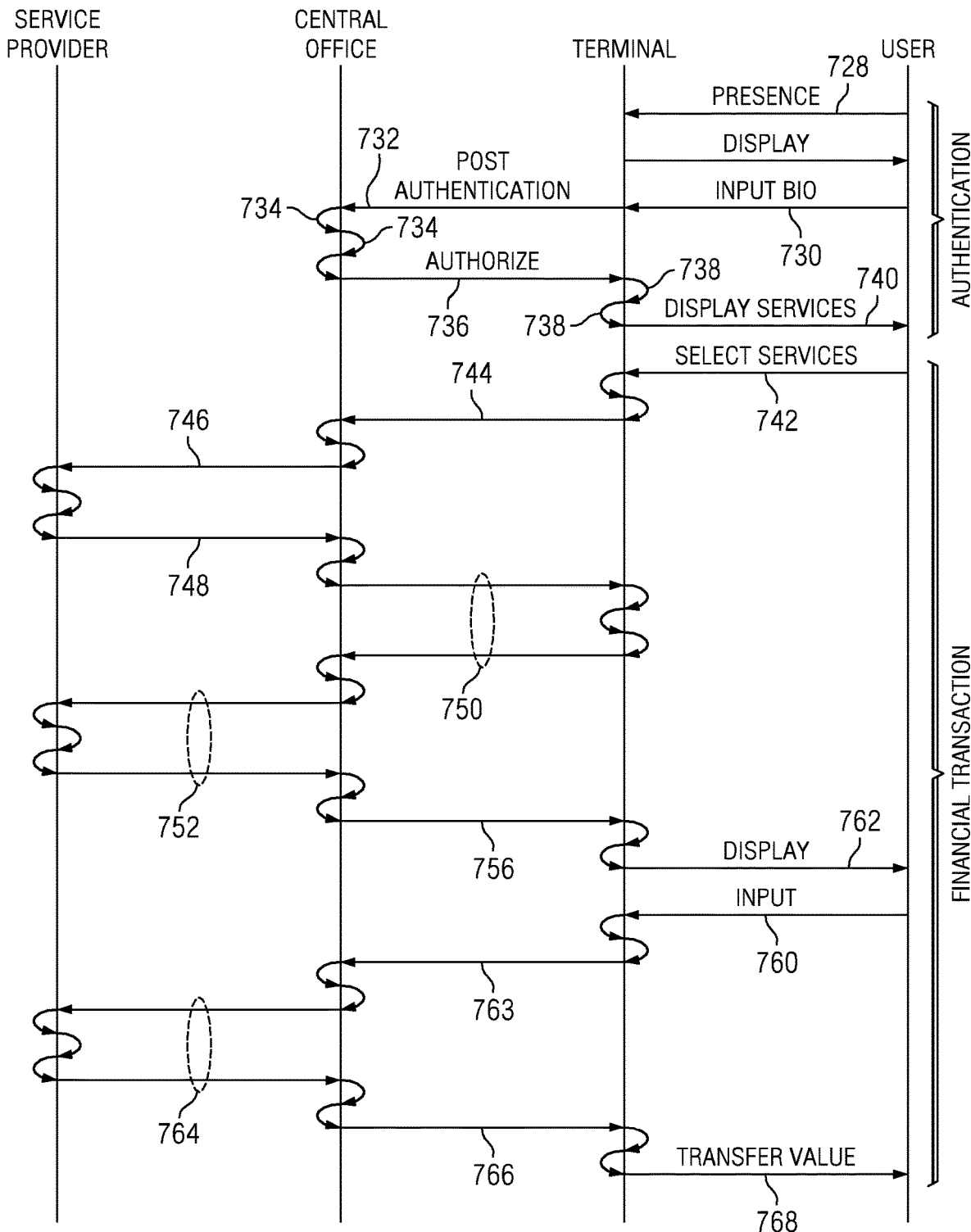
FIGS. 7A and 7B illustrate a diagrammatic views of a transaction process between the service provider, central office processor and terminal.

Referring now to FIG. 7A, there is illustrated a diagrammatic process of the overall transaction that is effected between a service provider, the central office processor 114, the terminal 110 and a user. This has been described hereinabove. As noted hereinabove also, the transaction is dispersed between the terminal, the central office and the service provider, i.e., certain steps of the transaction must be carried out at each location. The transaction is initiated in one embodiment by determining that a user is present at a particular terminal 110. This is illustrated by an arrow 728 indicating that the user is present. This can be a motion detector or a touch screen display that indicates to the user to touch the screen in order to initiate some type of transaction or terminal access. The terminal 110 will recognize this and then somehow change the terminal display for output of information to the user. The user is typically then required to input some type of ID or biometric information such as a palm vein scan, as indicated by an arrow 730. At this point, the terminal 110 has information associated with the user and, since this is all associated with the authentication procedure, a session will be opened and authentication of the user will be effected. This will be a set of instructions that is carried out on the terminal 110 that will require information to be sent to the central office processor 114, as indicated by an arrow 732. This is typically some type of request. At the central office processor 114, a sequence of instructions will be carried out wherein the authentication information received from the terminal 110 will be carried out to access information in the database to determine if the user is an authenticated user. This initiates a single session for this particular user and that particular terminal 110 at the central office processor 114. It should be understood that multiple processes could be carried on at the same time for different terminals 110 and it is only necessary for each process or session carried out at the central office processor 114 to be maintained thereat. Once the process has been carried out, as indicated by a plurality of process arrows 734, an authorization will be provided as indicated by an arrow 736 to the terminal 110. The terminal 110 then utilizes this authorization and determines what the next step is, as indicated by a plurality of arrows 738. Once the authorization has been received and the next step initiated, the next step will be to display available services to the user and indicate to the user that they have been authenticated, as indicated by an arrow 740. This is the end of the authentication process. Typically, a user will be authenticated on the entire system. Therefore, if the system is configured to provide an ATM function, a bill paying function, a ticket printing function, etc., all of these functions could be made available to the user merely upon the authentication of the user at the terminal 110. However, it could be that a particular user is only authorized for certain services and only those services would be provided to the user although other services are available at the terminal 110. In any event, the user will then be provided the ability to select a service, which is indicated by a selection arrow 742. The terminal 110 will determine which service module to initiate and, upon initiation, it will carry out the necessary instructions to generate a request packet to the central office processor 114, as indicated by an arrow 744. It may be that the terminal 110 collects information such as a value of money to be transferred, a value of money to disbursed through an ATM, etc. This information is collected by the terminal 110 and then transferred to the central office processor 114. The central office processor 114, once receiving this information, then processes the information to determine which module at the central office processor 114 is required. For example, if it were an ATM, based upon the particular user and their authentication, multiple service providers could be selected for this particular ATM transaction, although a single financial institution would typically be utilized. Thereafter, the central office processor 114 will transfer information to the service provider as indicated by an arrow 746 to transmit an initial request, followed by processing at the service provider and information transferred back to the central office processor 114, as indicated by an arrow 748. There are indicated a number of different instructions or sequences that must be carried out at each of the service provider, the central office processor 114 and the terminal 110. They are indicated additional transactions between the terminal and central office processor 114, as indicated by arrows 750, and additional requests and return of information from the service provider to the central office processor 114, as indicate by a sequence of arrows 752, and then an additional transaction at the end of some sequence of transaction comprised of the arrows 744-752, as indicated by an arrow 756 indicating that information now needs to be displayed to the user. This may be in the form of a balance in an ATM or some other information that is required from the service provider in order to go forward with the transaction. Once this is provided to the user, there may an additional input, as indicated by an arrow 760 that was preceded by a display arrow 762, wherein an input of information is provided to the terminal 110 and then the terminal 110 will execute the sequence to determine what to do with this input, and this example financial transaction indicates that information will be transmitted to the central office processor 114 by an arrow 763 followed by a sequence of transactions between the central office processor 114 and service provider indicated by arrows 764, followed by a final completion of transaction arrow 766 from central office processor 114 to terminal 110, wherein value will be transferred to the user as indicated by an arrow 768. This diagrammatic view indicates a general sequence of instructions that may be associated with any transaction. This is not to be interpreted by way of limitation as there are many different requests back and forth between the terminal 110 and central office processor 114 and the service provider that need to be facilitated in order to effect an entire financial transaction. Also, at the end of particular financial transaction, another financial transaction could be selected.

Figure 7B:
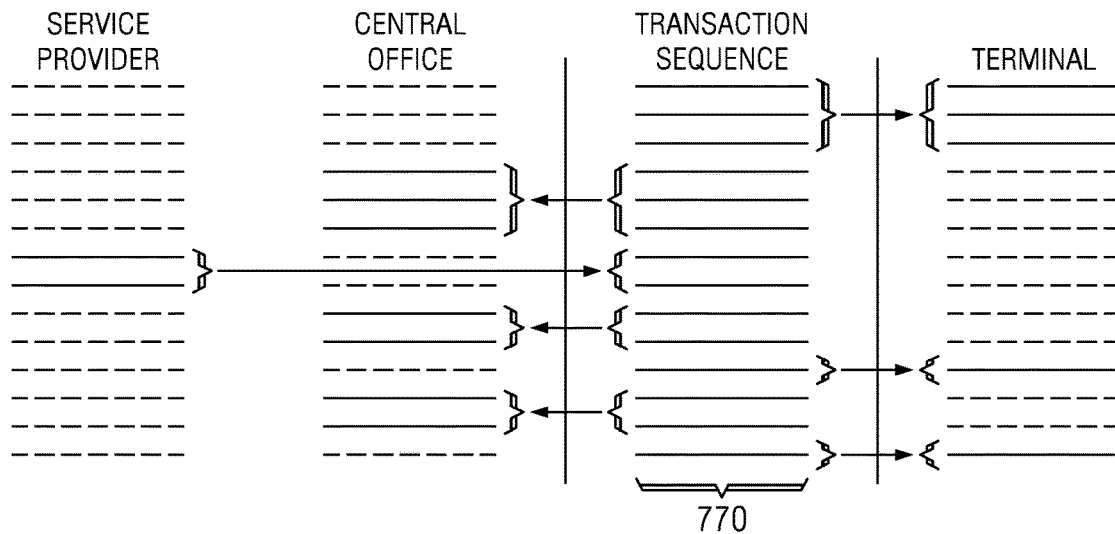

Referring now to FIG. 7B, there is illustrated a second diagrammatic view of the unique manner by which an overall transaction sequence 770 is illustrated. This transaction sequence is the entire sequence of instructions in the system that must be effected from the time the user selects a service to the time that value is transferred or a denial of the service is provided. This sequence is an "interleaved" sequence in that certain steps are carried out by the terminal 110, certain steps are carried by the central office processor 114 and certain steps are carried out by the service provider. It can be seen that the first steps will be carried out by the terminal 110 followed by steps at the central office processor 114 and certain steps at the service provider and so on. It is also noted that the terminal 110 need only have a certain portion of instructions or sequence disposed thereat. These instructions or sequences can be reduced to a minimal amount, depending upon the design thereof. For example, if it is desirable to have all of the authentication data disposed at the central office processor 114, all instructions and sequences necessary to authenticate a user can be carried out at the central office processor 114. Thus, to configure a particular terminal 110, all that is required is to download the sequences necessary for carrying out a particular transaction in a particular service module. Thus, a large portion of the sequence can be disposed at the central office processor 114. The configuration information that is associated with a particular service can be referred to as "scripts," which comprise a definition of a particular sequence of actions or transactions or instructions that need to be carried out at the terminal 110 in order to effect a communication with the central office processor 114 such that the central office processor 114 can then select a particular service provider to complete the transaction and carry out the necessary instructions to interact between the service provider and the terminal 110.

Figure 8A:
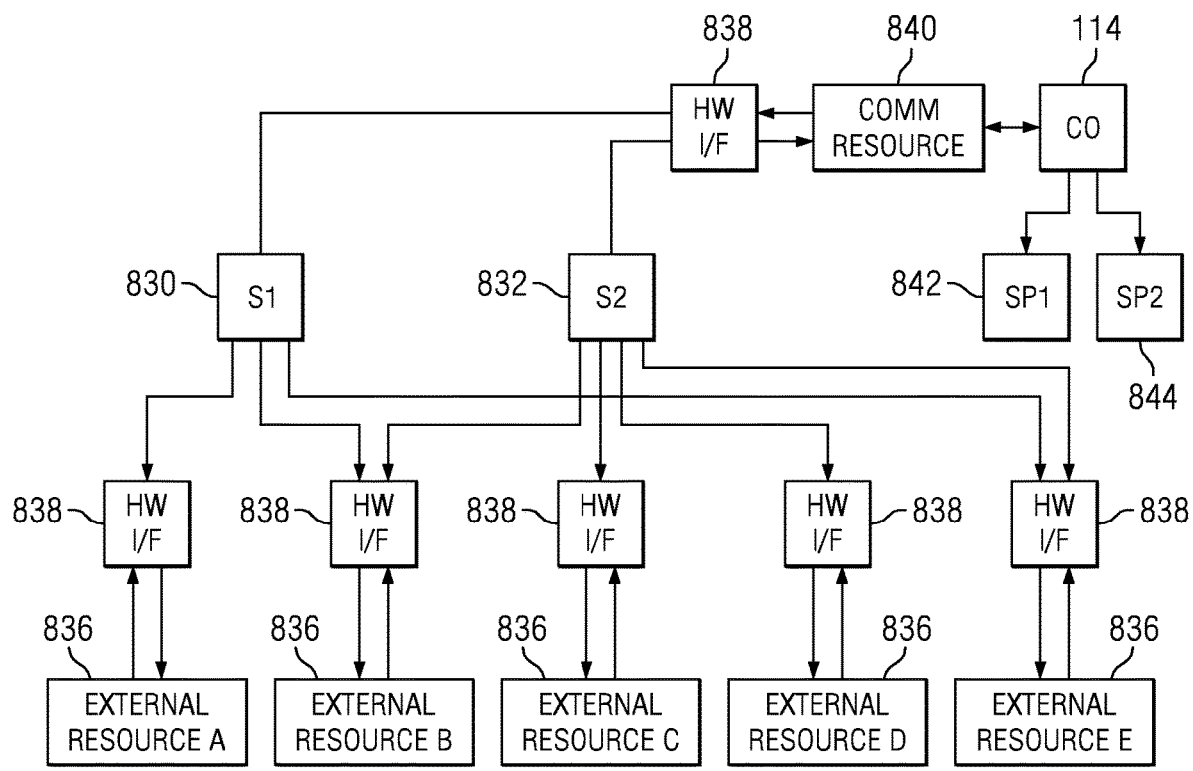
FIG. 8A illustrates a diagrammatic view of the interface between service modules and external resources.
Figure 8:
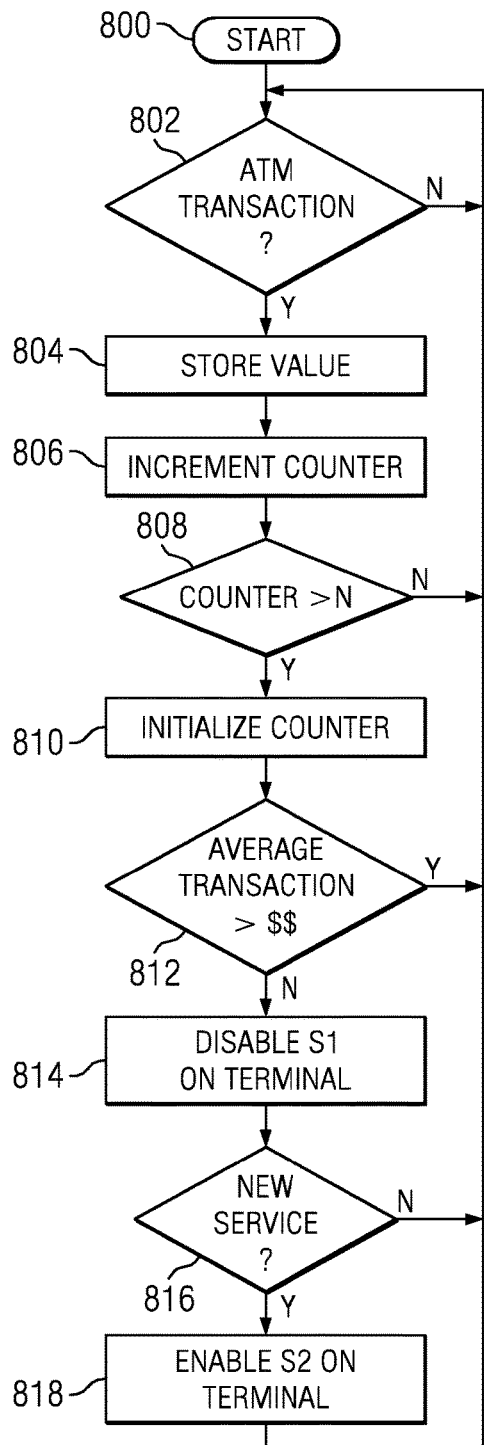
FIG. 8 is a flowchart illustrating a process of dynamically reconfiguring the services provided by the system of FIG. 1 at a selected terminal.

FIG. 8 is a flowchart illustrating a process of dynamically reconfiguring the services available on a terminal 110. In some embodiments, a service provider or the operator of system 100 may wish to provide one or more services at those terminals 110 only when certain criteria are met. In this embodiment, a service s1 is provided at terminal 110 only if the cumulative value of a selected type of transaction, for example cash withdrawals, exceeds a predetermined amount. The process begins at step 800 where a transaction is initiated by a user. At step 802, the transaction is identified. If the transaction is a cash withdrawal, in which case terminal 110 may be functioning as an ATM, the value of the transaction is stored at step 804 and a counter is incremented at step 806. At step 808, the counter is checked to determine whether a predetermined number n of cash transactions have been processed with terminal 110 within a predetermined time frame. If the number of cash transactions is less than n, the process loops back to the start.

If n cash transactions have been processed with terminal 110, the average amount of the transactions is determined at step 812 and compared to a predetermined value, for example $300. If the average value of the cash transactions is equal to or exceeds the predetermined value, the process loops back to the start. If the average value of the cash transactions is less than the predetermined amount, service s1 may be disabled on terminal 110. User interface devices and/or hardware devices associated with service s1 may also be disabled, or disabled in connection with the service. For example, if the service involves providing event tickets, the ticket printer may be disabled. At step 816, a determination is made as to whether another service should be added or substituted for service s1. If so, a new service s2 may be enabled on terminal 110 at step 818 by central office processor 114. Enabling new service s2 may also require enabling user interfaces and/or hardware associated with the service. Services that are deleted or inoperable due to hardware problems may be "grayed out" or deleted from display 210.

It will be appreciated that other criteria may be used for dynamically configuring the package of services provided on a selected terminal 110. Such criteria may include the aggregate number or amount of transactions conducted with terminal 110, when the transactions are conducted, the number or amount of transactions conducted using a particular service and other factors. It will also be appreciated that user interface devices and/or other hardware devices may be enabled or disabled on terminal 110 as a result of reconfiguring the terminal as described above. The decision to reconfigure the services and/or hardware of a selected terminal may be determined by pre-programmed logic resident on central office processor 114 or on terminal 110.

Referring now to FIG. 8A, there is illustrated a diagrammatic view of how resources can be shared between different service modules. There are illustrated two service modules 830 and 832. These can be very similar modules or significantly different. Each of the service modules 830, 832, when implemented, will require certain external resources in order to provide the service. Initially, a determination will be made as to whether the external resources are "enabled" or available. The initial configuration will enable the various resources, but if one of the resources fails then the monitoring function of the central processor unit will determine such is the case and the service module that requires such resource will then be disabled and an indication provided in the "heartbeat" back to the central office processor 114 that such is the case. However, when all of the resources that are required by a particular service module are available, each of the service modules, such as service modules 830 and 832, will be associated with their associated external resources. In the embodiment of FIG. 8A, there are illustrated five external resources 836 labeled A, B, C, D, and E. Each of these external resources has a hardware interface 838 associated therewith. The hardware interface, as described hereinabove with respect to FIG. 2E, is operable to provide a physical hardware "plug" that will interface with the particular external resource in addition to some type of software driver that will allow the central processor effectively communicate with the external resource to make use of the external resource for input/output and also to monitor that external resource.

In FIG. 8A, service module 830 requires the use of external resource A, external resource B and external resource E. Service module 832 requires the use of external resource B, external resource C, external resource D and external resource E. Therefore, external resource B and external resource E are shared between the two service modules. This can be a situation where, for example, the keyboard is required in order to carry out the particular transaction associated with a particular service module, or a printer is required for both, whereas possibly one service module requires a cash dispensing system and the other does not if it were associated with, for example, a bill paying transaction. Each of the service modules 830 and 832 will interface with a communication resource module 840 through an associated hardware interface 838. This communication and resource module 840 will communicate with the central office processor 114, which will then in turn communicate with the service providers and wherein there are two service providers 842 and 844 illustrated. Thus, a single "pipe" is provided the terminal 110 to communicate between selected services modules 830 or 832 and a particular service provider 842 or 844. Thus, it can be seen that sharing the resources for the provision of different services and allowing the resources to be remotely enabled/disabled provides a significant amount of flexibility to providing services to a user at a particular location associated with terminal 110.

Figure 9:
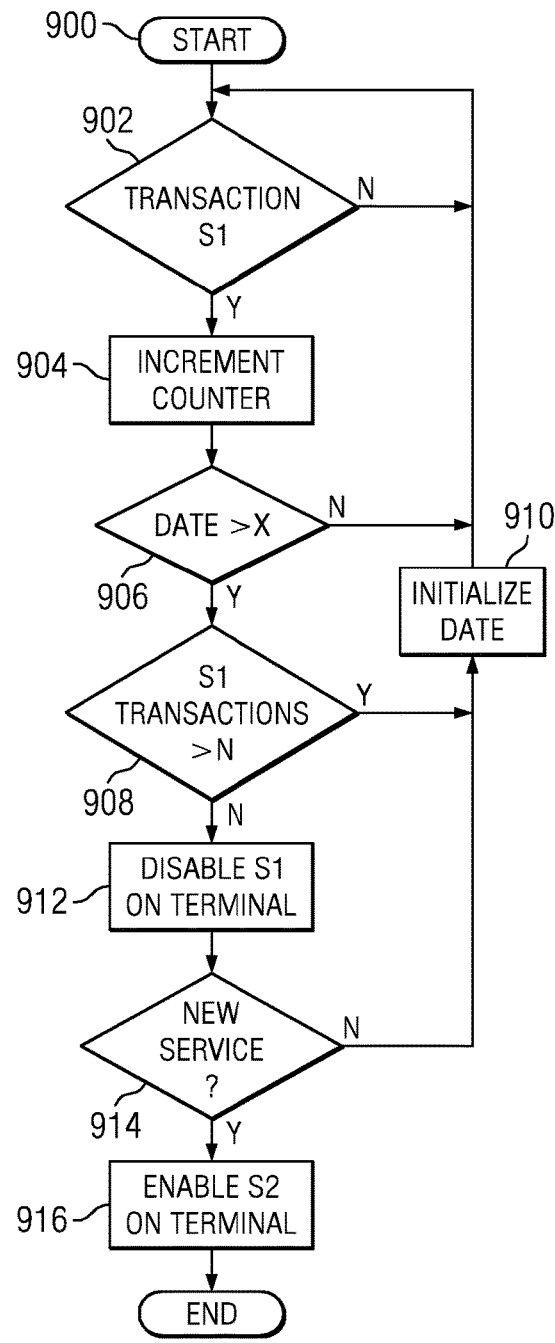
FIG. 9 is a flowchart illustrating a method of dynamically reconfiguring a service provided by the system of FIG. 1 on a terminal based on the frequency at which a selected service is used on the terminal.

FIG. 9 is a flowchart illustrating a method of reconfiguring a terminal 110 based on the frequency at which a selected service is accessed by users within a given time frame. The process starts at step 900 where a customer initiates or completes a transaction. At step 902, a determination is made as to whether the transaction involved a particular service s1. If not, the process loops back to Start. If the transaction involves service s1, a counter is incremented at step 904. At step 906, a date check is made. If the date is less than a predetermined value x, corresponding to the selected time frame, the process loops back to Start. If the date is greater than x, the total number of transactions involving service s1 within the time frame is determined at step 908 and compared to a predetermined value n. If the number of transactions is equal to or greater than n, the process loops back to Start and the date is initialized or reinitialized at step 910. The new date will be based on a predetermined value, for example the date could be initialized so that periods of days, months or longer may be evaluated.

If the number of transactions involving service s1 is less than the predetermined value n, the service may be disabled on the terminal at step 912. The step of disabling the service may include disabling associated devices. For example, if the service is check cashing, a check reader may be disabled at terminal 110. Other user interface devices and hardware associated with different services will remain enabled.

At step 914, a determination is made as to whether to substitute a new service, s2, for the disabled service s1. If so, the new service is enabled on the terminal at step 916 and the process ended. If no new service was selected, the process loops back to the start. In this manner, terminal 110 may be configured and reconfigured based upon the number of transactions conducted with a selected service and/or a selected service provider.

In some embodiments involving transactions using a branded service, it may be desirable to display logos, trademarks, promotional material or other material regarding the service provider. For example, if a user is conducting a bank transaction with terminal 110, it may be desirable to display a touch screen having an appearance that simulates the appearance of that bank's ATMs and/or logos or trademarks of the service provider. Thus, for example, if a user is a customer of ABC bank and is withdrawing cash, a screen may be displayed to the user that simulates the screen used by ABC bank for its transactions.

Figure 10:
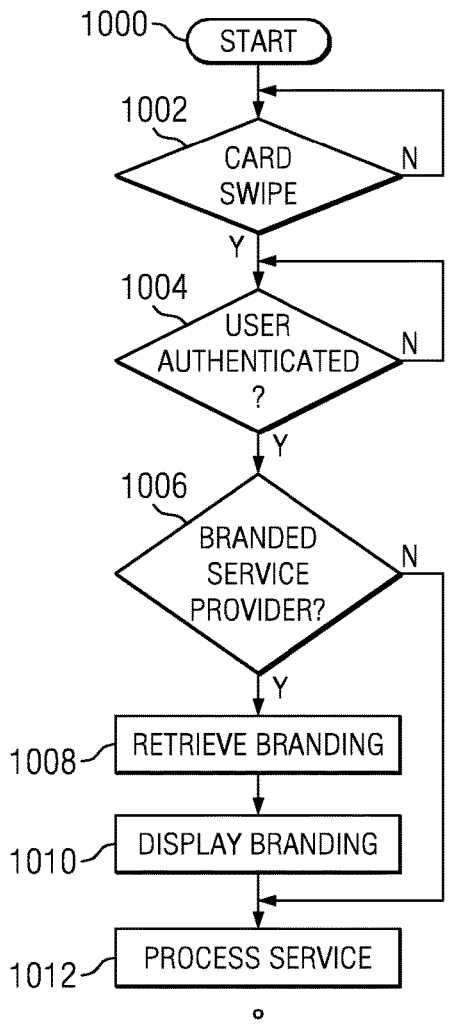
FIG. 10 is a flowchart illustrating a process for displaying branding materials.

FIG. 10 is a flowchart of a process for displaying such branding materials. The process begins at step 1000 where a user initiates a transaction. At steps 1002 and 1004, a card swipe is detected and the user is authenticated as previously described. At step 1006 a determination is made as to whether the selected service is provided by a branded service provider. If not, the process loops to step 1012 where the service is processed as previously described. If the service is provided by a branded service provider, the branding is retrieved at step 1008. The branding may include logos, trademarks, promotional materials or other information in a screen display presented to the user at step 1010 after which the service is processed at step 1012.

In certain situations, a particular company may desire to brand a plurality of the terminals 110 for a feature such as, for example, the ATM service. Thus, whenever the "splash" page is presented to a user, it is branded with the particular company. This branding is part of the stored script at the terminal 110. In the event that ownership changes or a particular company is acquired or they change their name, all that is required to change the branding of a particular service or a particular terminal is to update that particular script at each of the terminals. This may involve just updating a few lines of code or just downloading an entirely new service module for the presentation aspect. This is easily facilitated in a number of ways. One method would be to download the particular information in response to receiving a "heartbeat" from each of the terminals, or alternatively, accessing each terminal by polling the terminal or initiating an access thereto.

As previously described and illustrated in FIG. 2A, terminal 110 may include a media display such as a flat screen monitor. In some instances, it may be desirable to select the promotional material displayed on such media display device based on the particular transaction initiated by the user or the amount of the transaction or even the profile information of the user. Promotional material may be selected to correspond to selected dates or holidays, or be based on the aggregate amount, number or type of transactions processed on the particular terminal.

Figure 11:
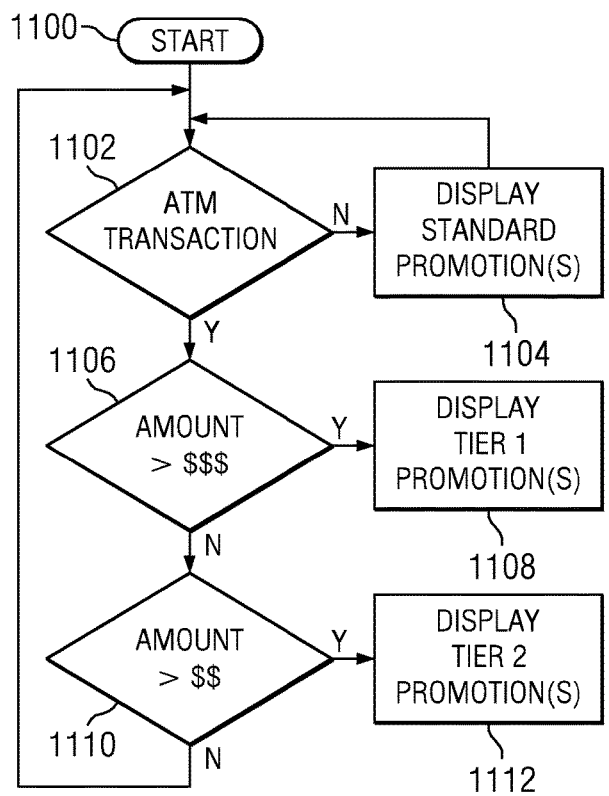
FIG. 11 is a flowchart illustrating a method of selecting promotional material to be displayed based on transaction size and/or type.

FIG. 11 is a flowchart illustrating a method of selecting promotional material to be displayed at terminal 110 based on transaction size and/or type. The process begins at step 1100 where a user initiates a transaction. In the illustrated embodiment, the transaction is a cash withdrawal from an ATM machine; however, other transactions may be used in the method. At step 1102, a determination is made as to whether the selected transaction is a cash withdrawal. If not, a set of standard promotional material and/or displays are presented on the media display 238 of FIG. 2A at step 1104. At step 1106, the amount of the cash withdrawal is compared to a first predetermined value, for example $300. If the transaction is for $300 or more, tier 1 promotions are displayed on the media display device at step 1108. Tier 1 promotions may be advertising for higher priced goods and services than those advertised in the standard display.

If the transaction amount is less than the first predetermined value, the amount is compared to a second predetermined value, for example $100 at step 1110. If the transaction amount is greater than or equal to $100, then second tier promotional material is presented on the media display device at step 1112. Tier 2 promotional device may be advertising for goods and services less expensive than those promoted in tier 1 promotions but more expensive than the goods and services promoted in the standard promotional display. If the transaction amount is less than the second predetermined value, the process loops back to Start and standard promotional materials are displayed on the media display device.

As will be appreciated from the foregoing, promotional materials displayed on the media display device of terminal 110 may be selected based on a wide variety of factors. Such factors may include the type of service selected, the transaction amount, and the size or type of transaction. For example, promotional materials displayed on the media display device of terminal 110 may be based on the average or aggregate transaction amount over a predetermined time period such as a day, week or month. The promotional material displayed on the media display device may be selected based on the number of times or the number of transactions involving a particular type or types of services provided.

Figure 12:
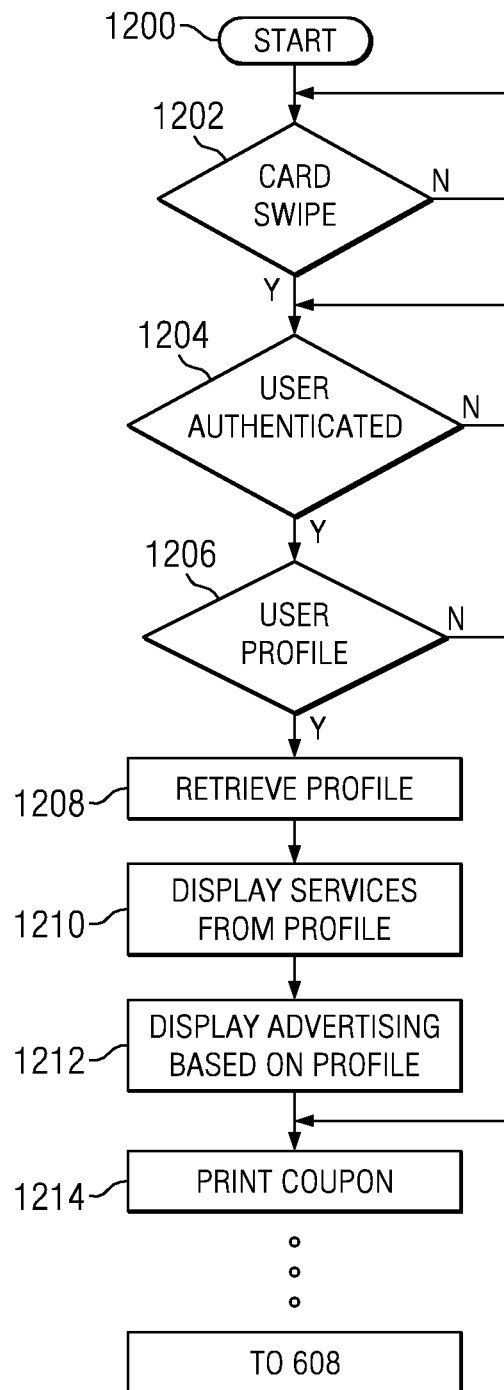
FIG. 12 is a flowchart illustrating a method for configuring a terminal in the system of FIG. 1 based on a user profile.

FIG. 12 is a flowchart of a method of configuring a terminal 110 based on a user profile. The process begins at step 1200 where a user initiates a transaction. At steps 1202 and 1204, a card swipe is detected and the user is identified as authenticated as previously described. At step 1206, the user's identity is compared to user profiles stored in a database either at terminal 110 or in a database at central office processor 114. The user profile may include information such as a user's age, race, the size of transactions completed by the user using the system and other information. If a user profile is located, the profile is retrieved at step 1208 after which a number of different actions may be taken based upon the profile. For example, at step 1210 a screen display including those services that the user has utilized in the past may be displayed. At step 1212, advertising or promotional material may be presented to the user on the media display device. The selection of promotional material may be based on the user's age, gender, the type of transactions the user has conducted utilizing system 100 in the past and other factors.

Other actions may be taken based on the user profile. For example, at step 1214 coupons for selected goods and services may be printed for the user based upon his or her profile. In other embodiments, if the user's profile indicates that the user has conducted transactions using a particular service not enabled on the particular terminal 110, the service may be enabled on the terminal, along with associated interfaces and/or hardware by central office processor 114. Alternatively, if for some reason the user profile indicates that the user is not approved to access a given service or conduct a particular type of transaction, the service and associated user interface devices may be disabled on the terminal. Thus, it will be appreciated that terminals 110 may be configured based upon the profile of the particular user conducting a particular transaction at that time. Note that "configured" as used in this context means enabling certain service modules and associated resources whereas the operation of downloading "configuration" information relates to downloading the necessary "scripts" for desired service modules.

Figure 13:
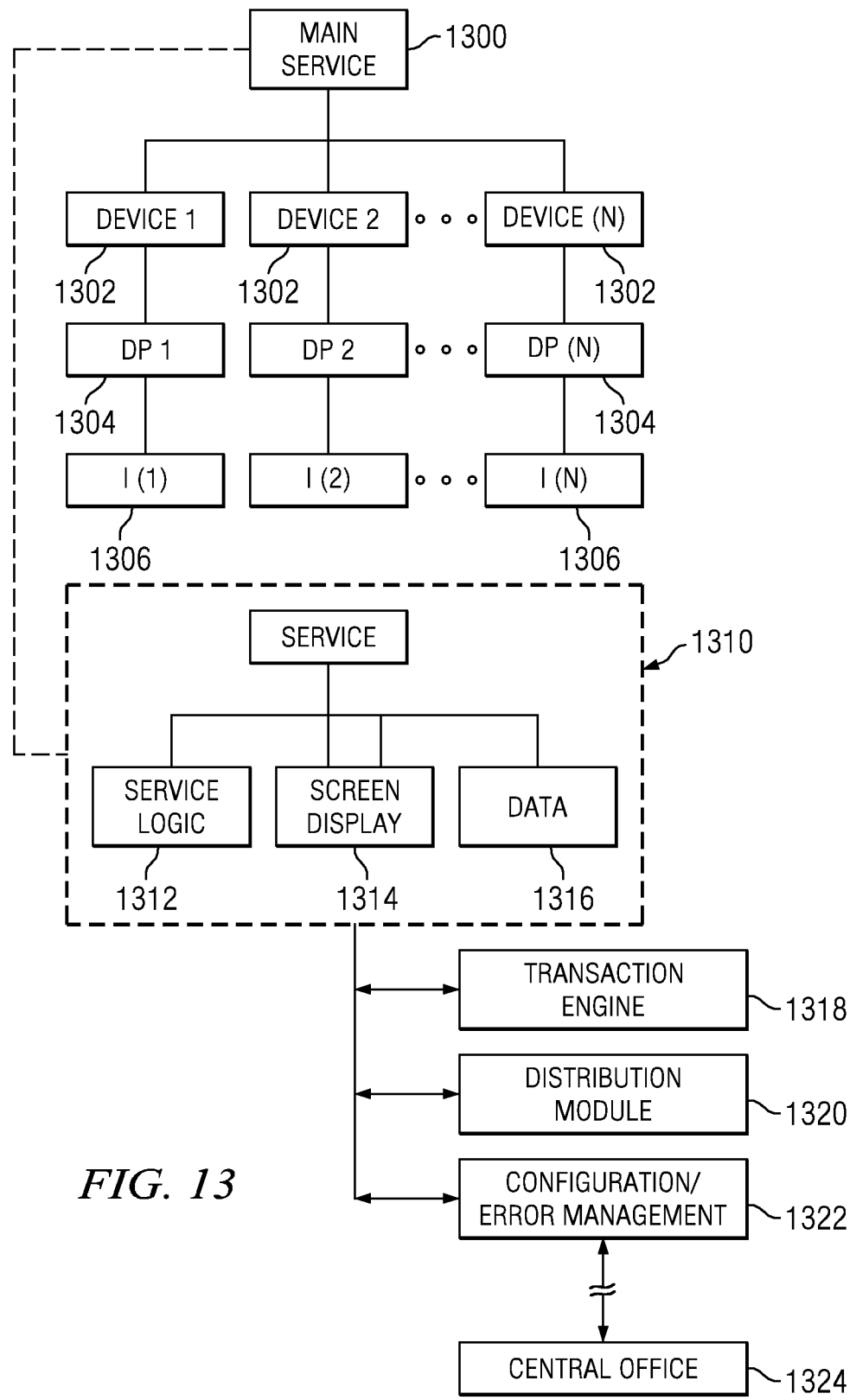
FIG. 13 is a diagrammatic block diagram illustrating the configuration of one system according to the disclosure.

FIG. 13 is a diagrammatic block diagram further illustrating the configuration of terminals 110 (FIG. 1). As shown, each of terminals 110 is configured with a main service or service pack 1300. Main service 1300 interfaces with a plurality of I/O devices installed on terminal 110. A device package 1304 is provided for each device installed on terminal 110. Device package 1304 includes the software and firmware necessary for the terminal 110 to interface with the particular device. As illustrated, a physical interface 1306 is provided for each device. As described hereinabove, the physical interface 1306 may be a USB connector or other hardwired connectors designed for the particular device. Devices 1302 (external resources) may include graphic user interfaces (GUIs), card swipe devices, keyboards and similar devices as illustrated in FIGS. 2B and 2E.

Main service 1300 may interface with a plurality of different services 1310. Services 1310 may include typical ATM transactions, ticket sales, bill paying services, card dispensing services and the like. Services 1310 will have associated service logic 1312, a screen display 1314 and associated data 1316. Services 1310 may interface with a transaction engine 1318, a distribution module 1320 and/or a configuration/error management module 1322. Depending upon the particular configuration of the terminal 110 and the desired service 1310, the main service module 1300 may interact with a central office processor 1324 in order to enable a user to perform various transactions as described with respect to FIGS. 7A and 7B.

Figure 14:
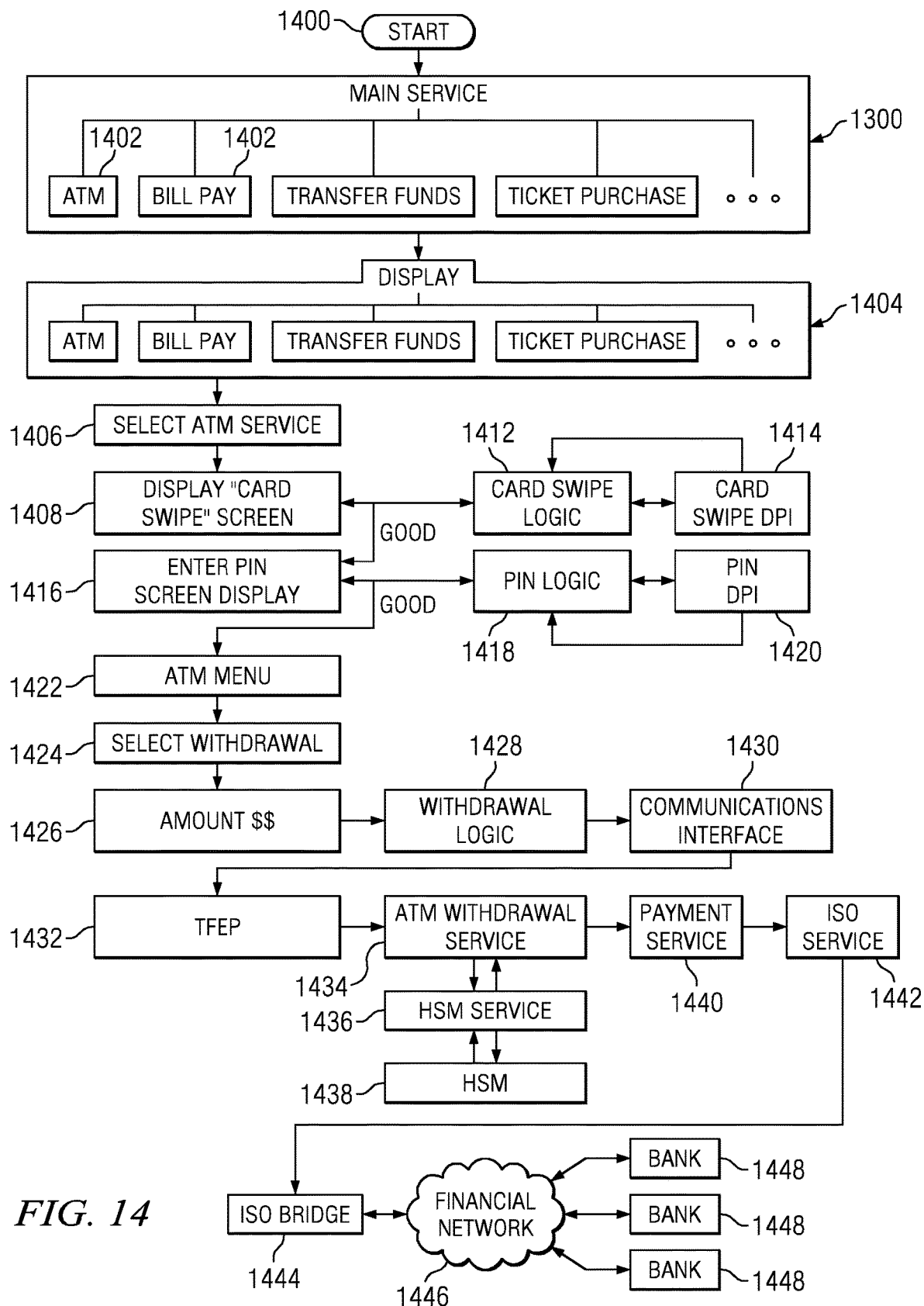
FIG. 14 is a flowchart illustrating a first possible transaction performed using the systems of the disclosure.

FIG. 14 is a flow chart illustrating one possible transaction performed using a terminal 110 (FIG. 1). The process begins at step 1400 where the main service is implemented on terminal 110. The main service 1300 may include or have access to different service modules 1402. Modules 1402 may include ATM services, bill pay services, services for transferring funds, ticket purchase services and so forth. At step 1404, terminal 110 displays the various available services at the particular terminal. In this example, a user selects ATM services at step 1406. At step 1408, a card swipe display screen is presented to the user to prompt the user to swipe his or her credit or debit card. At step 1412, the ATM service module 1402 accesses card swipe logic and the card swipe device package interface 1414 to record the user's information from the card. Assuming that the card swipe is successful, at step 1416 an enter PIN screen is displayed to the user. Main service 1300 accesses PIN logic 1418 and a PIN device package interface 1420 to enable a user to enter a personal identification number. It will be appreciated that, in lieu of a personal identification number and/or in addition to a personal identification number, a biometric parameter, such as a palm vein scan or fingerprint scan may be required.

At step 1422, an ATM menu is displayed to the user. As previously noted, the menu or the display may be branded with logos, trademarks or other indicia related to the user's financial institution. At step 1424, the user selects a withdrawal and at step 1426 selects an amount to be withdrawn from his or her account. At step 1428, withdrawal logic associated with the ATM service package is accessed by main service 1300 and a communications interface with central office processor 114 (FIG. 1) is opened at step 1430. At step 1432, terminal 110 transmits the transaction information to a transaction front-end processor ("TFEP") at central office processor 114. The communications with the transaction front-end processor will include the information from the user card, the user PIN number and/or any biometric parameter required to conduct the transaction. The transaction front-end processor in turn accesses an ATM withdrawal service at step 1434. At step 1440, a payment service module is accessed and the transaction information is provided to the module. The payment service module maintains records of money or value flowing in and out of the system, fees associated with the various transactions and billing information. Additionally, at step 1436, a host security module (HSM) is accessed and at step 1438, selected transaction information is encrypted for transmission.

At step 1442, the transaction information is transmitted to an ISO (International Standards Organization 8583 standard) service, including an ISO Bridge 1444 to create a data connection or link to financial network 1446. Financial network 1446 provides a data communication with banks 1448 or other financial institutions where a user may have an account or where the transaction may be processed.

It will be understood that the ATM transaction involves four steps. The first step is the withdrawal request transmitted as previously described. The second step is a response from the bank 1448 or other financial institution back through central office processor 114 to terminal 110. Assuming that funds are available, the financial institution will authorize the transaction and funds are dispensed by the terminal in the third step of the transaction. The funds may be dispensed in the form of cash, a stored value card such as a debit card or a funds transfer to a user or other account. Finally, a response from the terminal 110 is transmitted through the system to the financial institution indicating the amount actually dispensed. For example, if the user requested a $100 cash withdrawal and only $60 was dispensed due to a machine failure, a lack of cash available at terminal 110 or another reason, that information would be transmitted back to bank 1448 to enable the bank or financial institution to credit the user for any funds not received.

Figure 15:
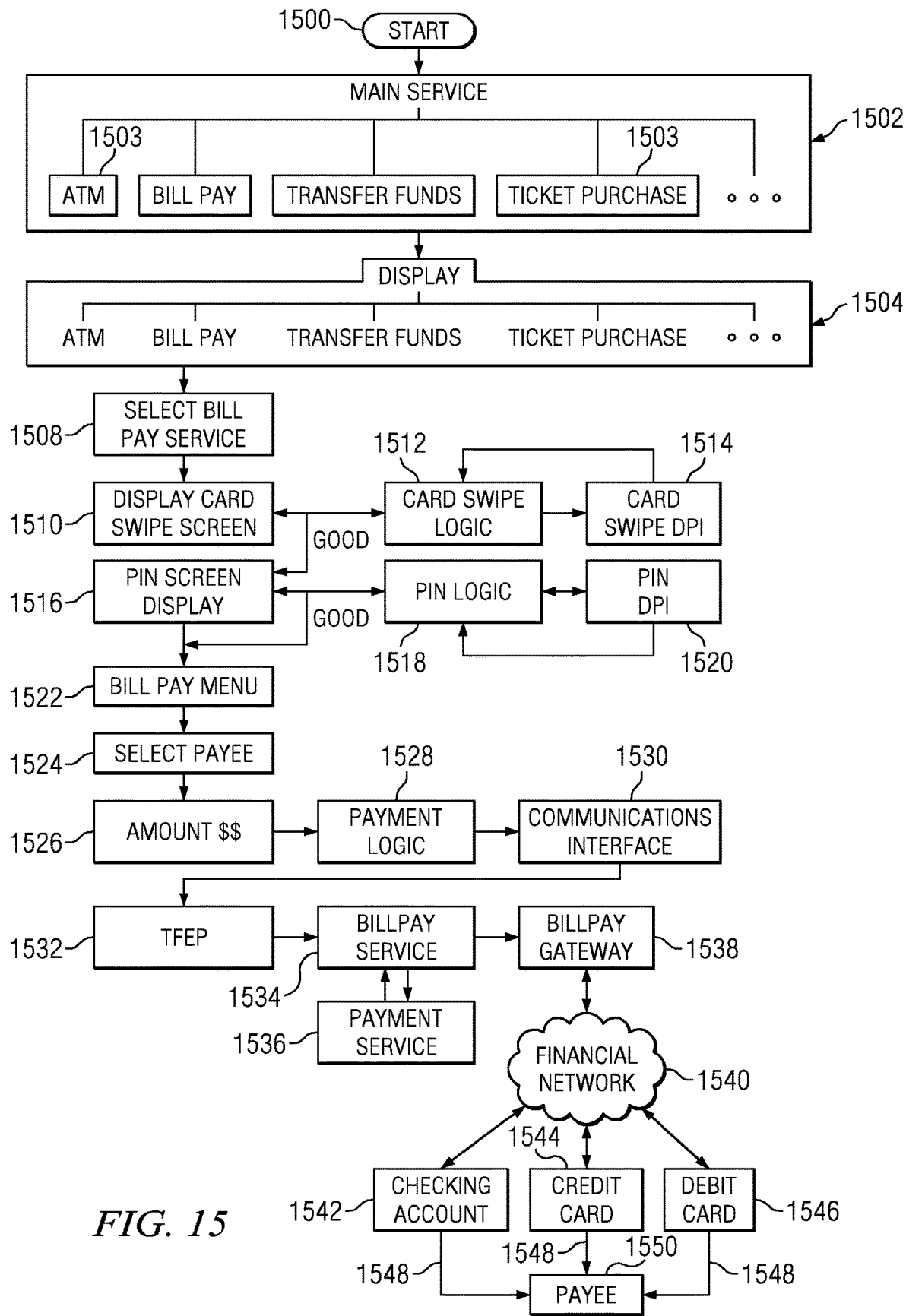
FIG. 15 is a flowchart illustrating a second possible transaction performed using the systems of the disclosure.

FIG. 15 is a flow chart illustrating another possible transaction performed using a terminal 110 (FIG. 1). The process begins at step 1500 where the main service or service pack 1502 is implemented on terminal 110. The main service 1502 may access a variety of service modules 1503. Modules 1503 may include ticket purchase services, bill pay services, services for transferring funds, ATM services, ticket purchase services and other services. At step 1504, terminal 110 displays the various available services to the user of the terminal. In this example, a user selects bill pay services at 1508 and a card swipe display screen is presented to the user at step 1510 to prompt the user to swipe his or her credit or debit card. In other embodiments, the display may include an option enabling the user to transfer funds from an exiting account to pay one or more bills or enter currency to pay the bill.

In this example, the user elects to use a credit or debit card to pay a bill; for example a utility bill, a telephone bill or other payment. At step 1512, the bill pay service module accesses card swipe logic (step 1512) and the card swipe device package interface 1514 to record the user's information from the card. If the card swipe is accepted, at step 1516 a screen display prompting the user to enter his or her PIN number is presented. Main service 1502 accesses PIN logic at 1518 and a PIN device package interface 1520 to enable a user to enter a personal identification number. As previously noted, a biometric parameter such as a palm vein scan or fingerprint scan may be required in addition to, or instead of, a PIN.

The process continues at step 1522 where a bill pay menu is displayed to the user of terminal 110. In one embodiment, the identity of prior payees, (e.g. utility company, phone company, finance company) may be retrieved from central office processor 114, (FIG. 1) and displayed such that the user may select (step 1524) the entity to which he or she wishes to make a payment with a user interface such as a keyboard or GUI. In other embodiments, the user may enter the identity of the payee and associated information such as an account number. The user may then enter the payment amount at step 1526.

Next, payment logic 1528 is accessed and a communications interface 1530 with central office processor 114 is opened. In one embodiment, payment logic 1528 is resident on terminal 110. Payment logic 1528 assembles the necessary information to complete the transaction and a communications interface with the central office processor 114 is opened at step 1530 enabling terminal 110 to communicate with transaction front end processor 1532. At step 1534, a payment service module 1536 is accessed. As previously described, payment service module 1536 maintains records of money or value flowing in and out of the system, fees associated with the various transactions and billing information for use by central office processor 114. In different variations, central office processor 114 may be configured with multiple transaction front end processors 1532 such that transactions are placed on a queue and processed with the first available front end processor.

A bill pay gateway or service is accessed at step 1538, which in turn opens a data link with financial network 1540. Financial network 1540 may provide access to the user's checking account 1542, to a credit card account 1544 or a debit card account 1546 to enable the user to complete the bill pay transaction by transferring funds as presented by arrows 1548 to the selected payee 1550. Confirmation of the payment may then be transmitted back through financial network 1540, bill pay service 1534, and front end processor 1532 to terminal 110 where a receipt may be printed or displayed to the user.

Figure 16:
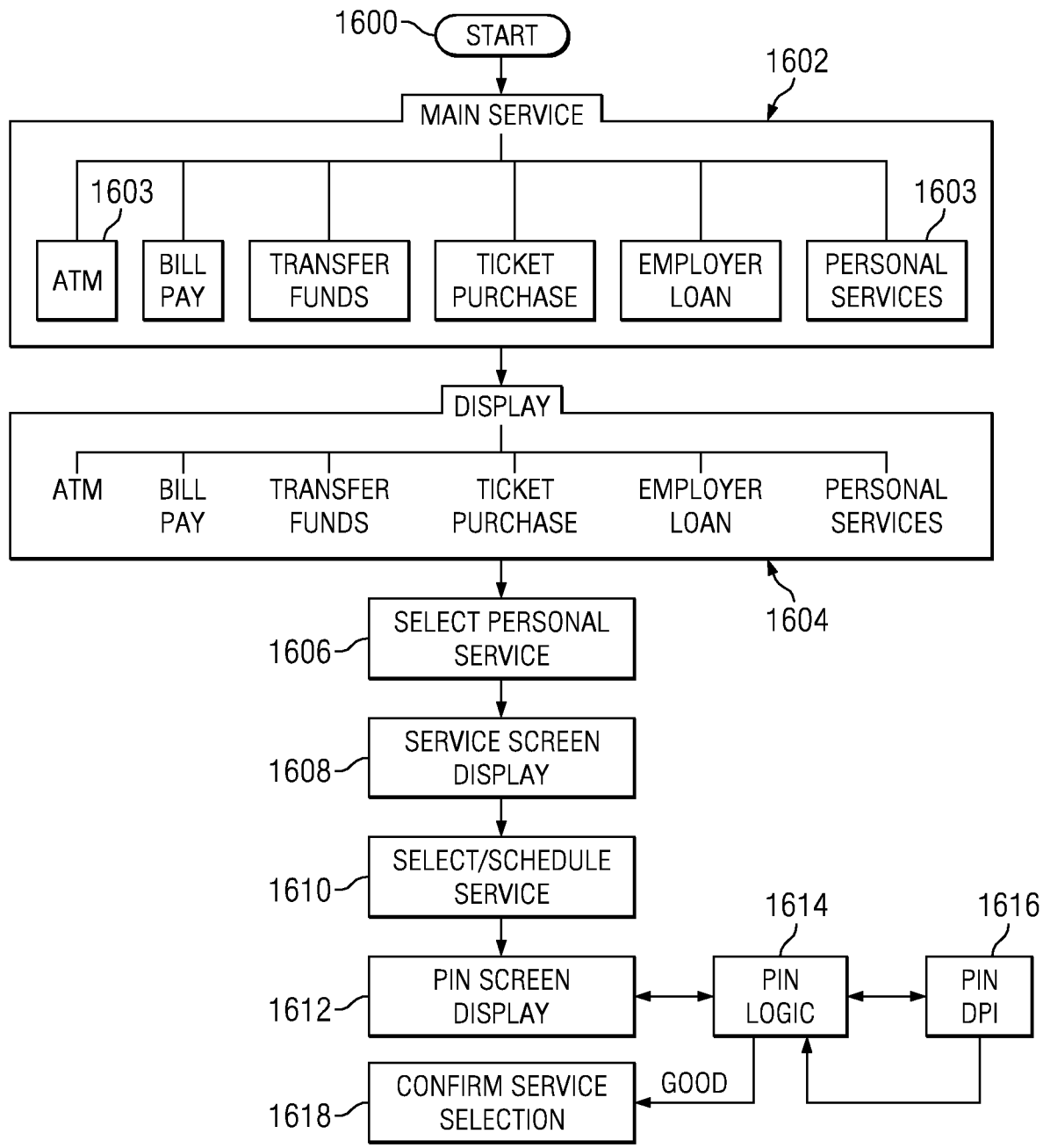
FIG. 16 is a flowchart illustrating a third possible transaction performed using the systems of the disclosure.

Turning now to FIG. 16, in yet another embodiment, a terminal 110 may be used to schedule a service such as a dental appointment, an inoculation, a physical examination or other service. In this embodiment, the process begins at step 1600 when a user accesses main service 1602, which may include service modules 1603 such as ATM services, bill pay services, funds transfer services, ticket purchase services, employer loan services and personal services. As previously noted, terminal 110 may be remotely configured from central office processor 114 to present these services to a user of the terminal based upon preselected criteria. In other embodiments, terminal 110 may be linked directly to one or more service providers via a network. The selected services may be displayed or presented via a user interface (step 1604) such as a graphical user interface ("GUI").

At step 1606, a user may select a personal service menu, which is displayed at step 1608. The user may then select the personal service that he or she wishes to obtain at step 1610 and schedule the service. At step 1612, the user may be prompted to enter a PIN which is processed with PIN logic at 1614 and PIN device package interface 1616 to enable a user to enter a personal identification number. As previously noted, a biometric parameter such as a palm vein scan or fingerprint scan may be required in addition to, or instead of, a PIN to verify the user's identity. At step 1618, the service selection and/or schedule is confirmed. In one embodiment, the user may elect to pay for the service as described in connection with FIG. 15.

Figure 17:
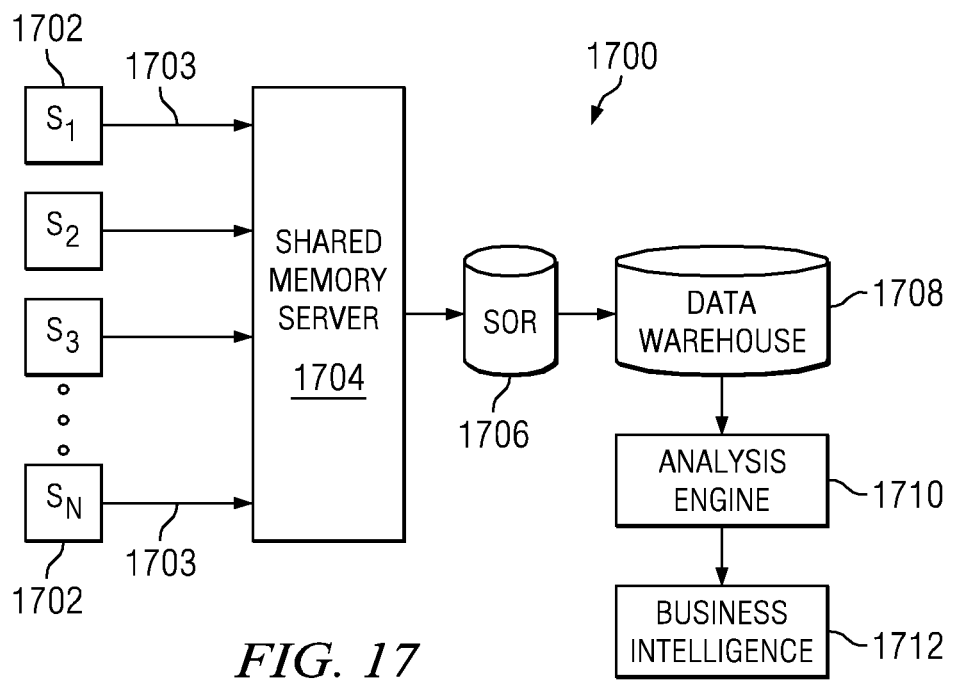
FIG. 17 is a diagrammatic block diagram illustrating one configuration of a data collection and storage system for use with systems of the disclosure.

FIG. 17 is a block diagram illustrating a data collection system 1700 that may be utilized in one embodiment of the invention. A plurality of services 1702 (e.g., ATM, funds transfers, purchases, bill pay services etc.) are made available on terminals 110 (FIG. 1). Selected data from transactions conducted using services 1702 is transmitted from terminal 110 to a shared memory server which may be located at central office processor 114 (FIG. 1) or another location as represented by arrows 1703. The data may be transmitted continuously on a real time basis as transactions are conducted or temporarily stored on terminal 110 and transmitted on a batch basis at predetermined intervals, for example every 12 or 24 hours. Shared memory server 1704 processes the data, which is stored on a system of records (SOR) database 1706. SOR database 1706 provides a means of recalling data relating to transactions conducted using terminals 110 in an expedient manner.

In order to maintain a manageable amount of data on SOR database 1706, data may be downloaded to a data warehouse 1708 at periodic intervals, for example weekly or monthly. In one embodiment, data warehouse 1708 is a very large storage device, capable of storing terabytes of information. In one embodiment, a data analysis engine 1710 may be utilized to analyze data stored on data warehouse 1708 to generate business intelligence 1712 such as the type and number of transactions conducted using terminals 110 and trends in the type and number of transactions. Business intelligence 1712 may be used to configure or re-configure terminals 110 with different services depending upon the demand for specific services. Business intelligence 1712 may also be used to select advertising presented on media display device 238 (FIG. 2A).

Figure 18A:
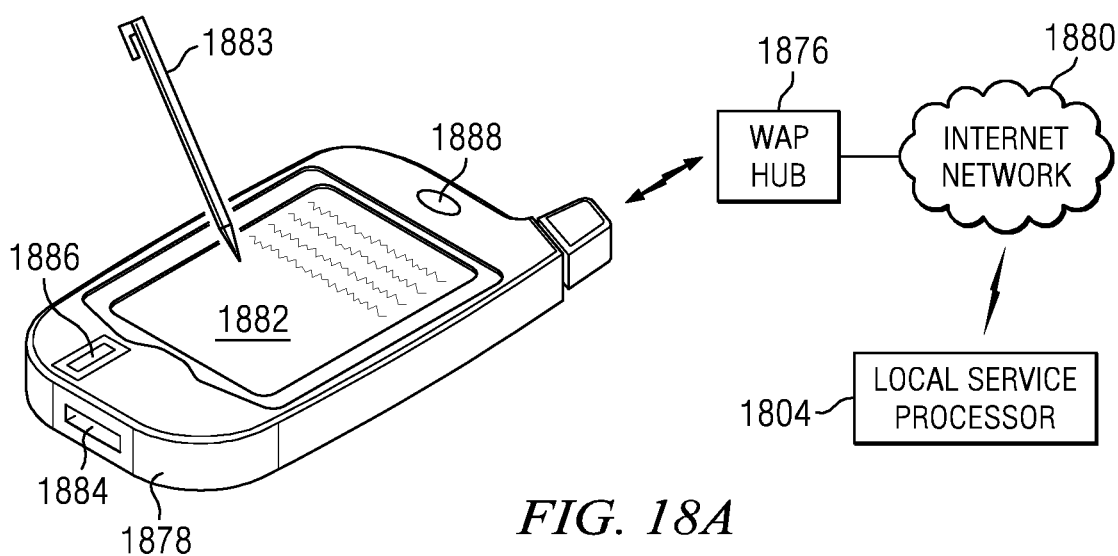
FIG. 18A illustrates a diagrammatic view of a remote terminal utilizing a PDA.
Figure 18:
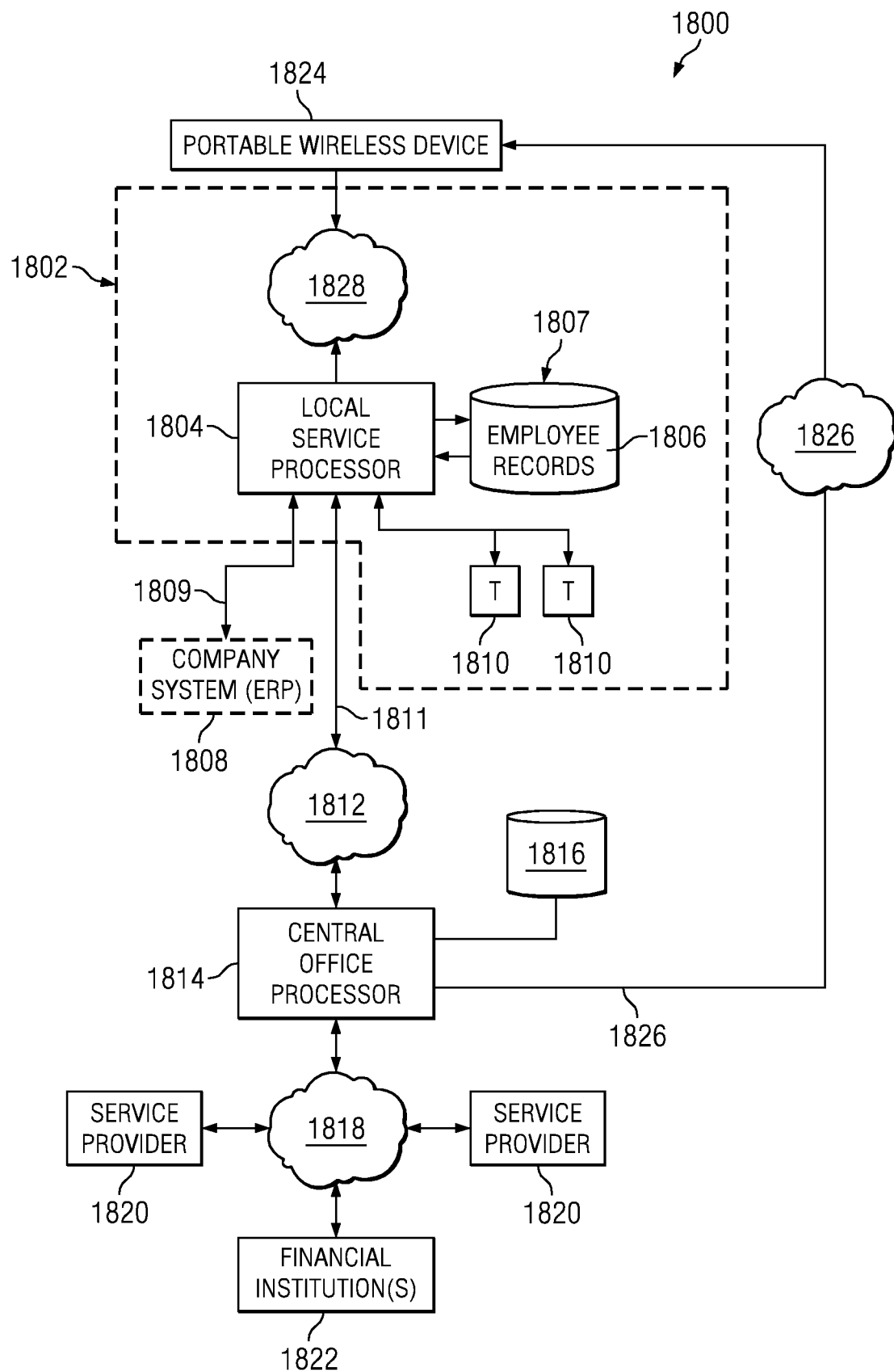
FIG. 18 is a diagrammatic block diagram illustrating the configuration of another system according to the disclosure.

FIG. 18 is a block diagram illustrating another system 1800 in accordance with the disclosure. In the embodiment illustrated in FIG. 18, one or more terminals (employee access nodes) 1810 are located in a factory or similar facility 1802 where a significant number of employees, for example 50, 100, 200, 300 or more are employed. Employee access nodes 1810 are substantially similar to terminals 110 described in connection with FIG. 1 and may be configured with the same hardware and the same and additional functional features. In particular, terminals 1810 may be remotely and dynamically configured with different services as described in connection with terminals 110. As illustrated, terminals 1810 are interfaced with a local service processor 1804. A database 1806 associated with local service processor 1804 is maintained on a data storage device 1807 and contains selected information regarding employees as set forth in detail below. Specifically, data stored on database 1806 may include a record with employee earnings for a current pay period that have not been remitted to the employee. For example, if the pay period is two weeks, after which an employee is given a check for his or her earnings, and an employee has worked one week into the pay period, the record of the amount of earnings due to the employee for the week he or she has worked and not yet been paid (accrued earnings) may be recorded in database 1806. In many instances, an employer may pay an employee on a delayed basis, for example the employee may be paid for pay accrued during a pay period, a week or other predetermined interval after the end of the pay period.

A distinction should be made for "users" to the system disclosed with respect to FIG. 18 and one for the system. In general, when a user walks up to any terminal, whether it be the terminals 1810 within a corporation associated with the local server processor 1804 or terminals 110 located anywhere outside of the facility 1802, authentication is required of that user. Thus, a "user" can be a user for the entire system or a user only for the facility 1802. Once a user enters profile information and biometric information such as information associated with a palm vein scanner or personal ID information, this will provide information that is useful to authenticate a user when they walk up to any terminal 110 or terminal 1810. However, the user can have two different identities in the system. They can have an identity as an overall system user, i.e., a profile stored at the central office processor or they can have an identity for use only within the facility 1802. It could be that there is a general profile associated with a user. In the concept of having a general user system ID, it could be that authentication of a user will require interface with the central office processor 1814 in FIG. 18 that provides an overall system ID for the user. Thus, there will be a profile associated with that user constituting, in part, biometric information for the user, that can be utilized to authenticate the user with their system ID. This system ID can then be utilized if the user ventures outside of the facility 1802 for the purpose of using their personal ATM information. Within the facility 1802, as will be described hereinbelow, there will be information that is desirable to remain within the facility. For example, within the facility, it may be that the overall system user ID is stored in a relational database associated with an employee number and employee records. The associated profile information that is stored at the central office processor 1814 database 1816 could be duplicated at the local service processor 1804 in the database 1806. Thus, the user could, at the terminal 1810, enter their palm vein scan information to be authenticated, which could be completely authenticated by the local service processor using information in the database 1806. The user could even utilize their employee number in the most simplified case, which would then be related to the overall system user ID for authentication purposes.

Referring still to FIG. 18, a record of the employee's earning for the current pay period, or other predetermined period, may be obtained by means of an interface represented by arrow 1809 with the company's Enterprise Resource Planning Module (ERP) 1808 module or similar computerized payroll records maintained by the employer, owner and/or operator of facility 1802. In the case of employee records that are updated on a daily basis, for example for employees that "clock" in or out according to their work schedule, an employee's pay records may be updated and transmitted to local service processor 1804 and stored in database 1806 on a daily basis. In other embodiments, database 1806 may be updated on a weekly basis or other predetermined time interval. In some embodiments, the employee's ability to access accrued and unpaid earning will be cut off or terminated at a predetermined date (trigger date) or time prior to the employer's regularly scheduled disbursement of earnings. For example, if the employer normally disburses pay checks or makes direct deposits of employee earnings for a given pay period on a Friday, the employee's ability to access received and unpaid earnings for the pay period may be cut off or terminated on the Tuesday preceding the Friday when the employer makes normally scheduled disbursements. This allows time for the employer's pay records to be updated (debited) to account for transactions made by an employee using system 1800 before the employer disburses earnings for the period. This may be a pull or push operation with respect to the ERP.

Local service processor 1804 is provided with a data transmission interface represented by arrow 1811 with the central office processor 1814. Data transmissions between the local service processor 1804 and central office processor 1814 may be made via a wired network such as a local area network (LAN), the internet, a wired telephone network (POTS) or via a wireless network. In other embodiments, a cellular network may be employed for transmissions between the local service processor 1804 and central office processor 1814. Central office processor 1814 may include a database 1816 for storing employee records and transaction information and interfaces with service providers 1820 and financial institutions 1822 via a private or public network 1818 such as the internet to provide transactional services to employees of the owner/operator of facility 1802.

It will also be appreciated that local service processor 1804, database 1806 and terminals 1810 may be owned and/or operated by a third party. In one embodiment, the employee may be required to register (subscribe) with his or her employer and/or the owner and/or operator of system 1800 in order to utilize the system. In this embodiment, the employee may be assigned a unique personal identification number (PIN) and a biometric parameter such as a fingerprint or palm vein scan, which may be obtained and stored on database 1806 during the registration process. This may be a local PIN or ID or a system ID as described hereinabove.

Figure 19:
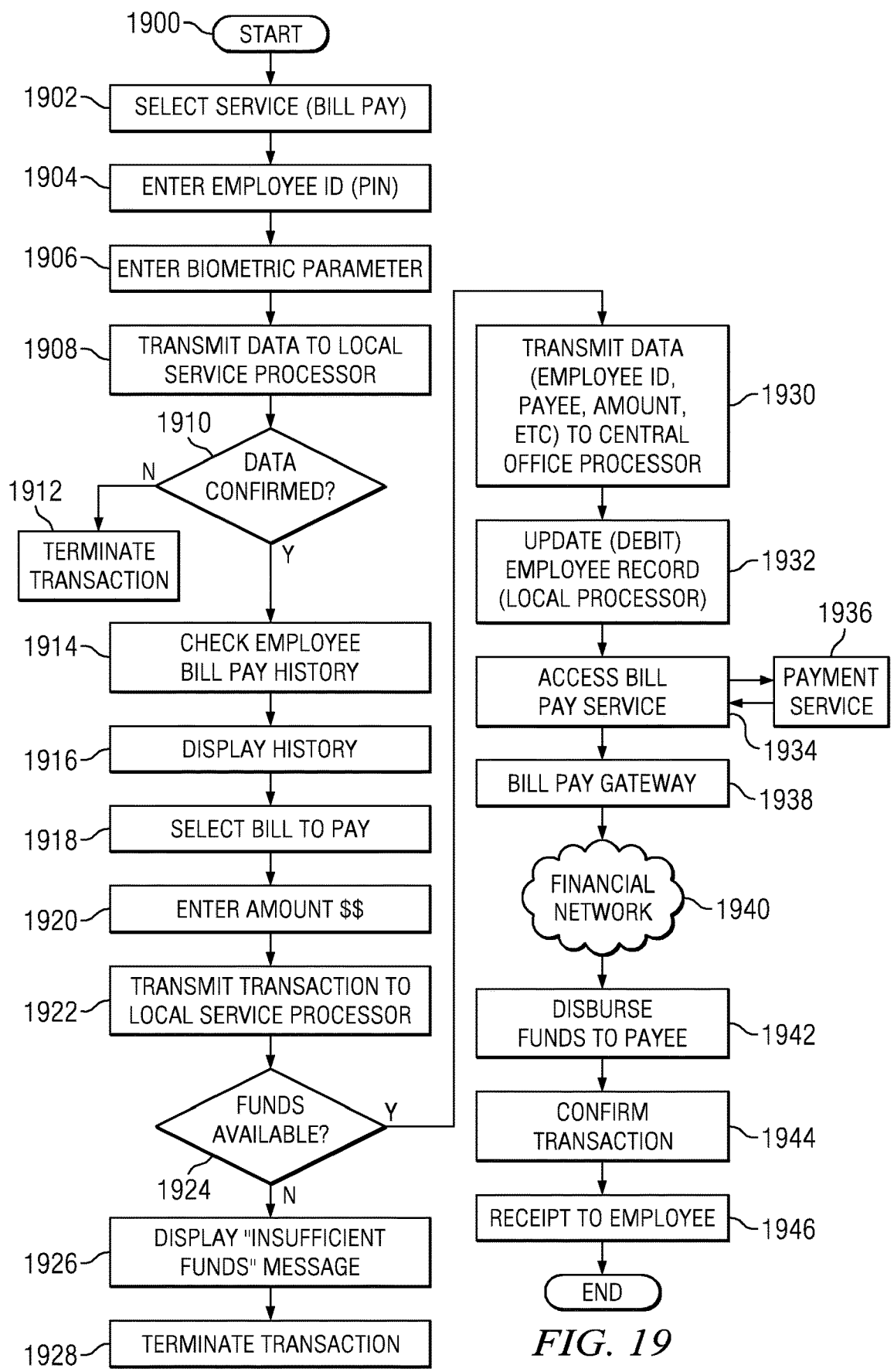
FIG. 19 is a flowchart illustrating a first transaction performed using the system of FIG. 18.

FIG. 19 is a flow diagram illustrating a transaction that may be conducted with system 1800 using a subscribing employee's accrued earnings that have not been remitted to the employee. Referring to FIGS. 18 and 19 in conjunction, the process begins at step 1900 where an employee accesses a terminal 1810 and accesses a bill pay service at step 1902 by means of a user interface such as a touch screen, keyboard or similar device. The process continues at steps 1904 and 1906 where the employee enters his or her PIN and a biometric parameter such as a thumbprint, fingerprint or palm vein scan, which is obtained from the employee. In different embodiments, only a PIN or biometric parameter may be required to continue. The employee information (e.g. PIN and/or biometric parameter) is transmitted to local service processor 1804 at step 1908. Local service processor 1804 accesses database 1806 at step 1910 to confirm the identity of the employee. If the employee's PIN and/or biometric parameter are not confirmed, the process is terminated at step 1912. Assuming that the employee data is confirmed, local service processor 1804 may access the employee's bill pay history at 1914 and display the employee's balance of accrued and unpaid earnings along with a list of payees to the employee at step 1916. The employee may then select a payee from the list displayed on terminal 1810 or enter a new payee at step 1918. In one embodiment, the employee may be allowed to select the amount to be paid at step 1920. In some variations, the employee may elect to receive funds directly in which case the employee access node may disburse value in the form of currency, a money order, a check, script, tickets or coupons to the employees. In this embodiment, a record of the transaction may be stored on local service processor 1804.

In the authentication process, as described hereinabove, it is possible that the initial authentication wherein each user always has a system-wide ID, may be performed at the central office processor 1814 wherein all profile information is stored. This will provide a general authentication to the system and then this can be relayed back to the local service processor 1804 to determine if that user is also associated with the facility, i.e., they are authorized to utilize the terminal within the facility for the purpose of accessing accrued funds. In this manner, all of the local pay records, employee numbers, etc., that would be proprietary to a facility would be maintained within a "bounded" network.

Referring still to FIG. 19, at step 1922 the transaction information, i.e. the payee and amount to be paid, is transmitted to local service processor 1804 and database 1806 is accessed to determine the employee's accrued, but unpaid earnings at step 1924. If the accrued but unpaid earnings are insufficient to pay the bill, terminal local service processor 1804 responds to terminal 1810 with an "insufficient funds" or "transaction denied" message which may be displayed to the employee at step 1926 and the transaction is terminated at step 1928. In different embodiments, a threshold limit on the amount of funds that the employee may access and utilize with system 1800 may be set. The threshold amount could be a percentage of accrued but unpaid earnings, for example 40% or 60% or could be a set amount of currency, for example $200.00.

At step 1930, the transaction information (employee ID, payee, amount, etc.) is transmitted to central office processor 1814, which records the transaction on database 1816. The employee's records are updated on local service processor 1804 and database 1806 to reflect the transaction at step 1932. Central office processor 1814 accesses a bill pay service at step 1934 which in turn accesses a payment service at step 1936 as previously described in connection with FIG. 15. At step 1938, the bill pay service accesses a bill pay gateway to connect with a public or private financial network at step 1940 after which the funds are electronically disbursed to the payee at step 1942. The payee confirms the transaction at step 1944 and a message is transmitted through networks 1812 and 1818, central office processor 1814 and local service processor 1804 to terminal 1810 where a receipt may be printed or displayed to the employee at step 1946. In this operation, value is first determined as being available to an employee as "virtual funds" and then a desired amount "transferred" from the virtual funds for payment of the bill or for any other transaction.

Referring again to FIG. 18, system 1800 including local service processor 1804, database 1806, terminals 1810 and central office processor 1814 may be owned and/or operated by a third party. In this embodiment, the third party may charge the employee a fee for providing bill pay or other services such as pay advances for accrued but unpaid earnings. The third party operator of system 1800 also aggregates the cost of services, for example bill pay services and advances to employees over a predetermined period and bills the owner and/or operator of facility 1802 for funds dispersed by or received by employees during the period. For example, if the owner/operator of facility 1802 distributes paychecks on alternate Fridays, the third party may bill the owner/operator of facility 1802 on the Wednesdays preceding the Friday on which the employer disburses paychecks to its employees. Accrued earning spent or received by employees may then be deducted from their paychecks for the pay period by the employer. The third party absorbs the risk of authentication errors or fraud and the costs for all financial advancements to a user/employee.

Figure 20:
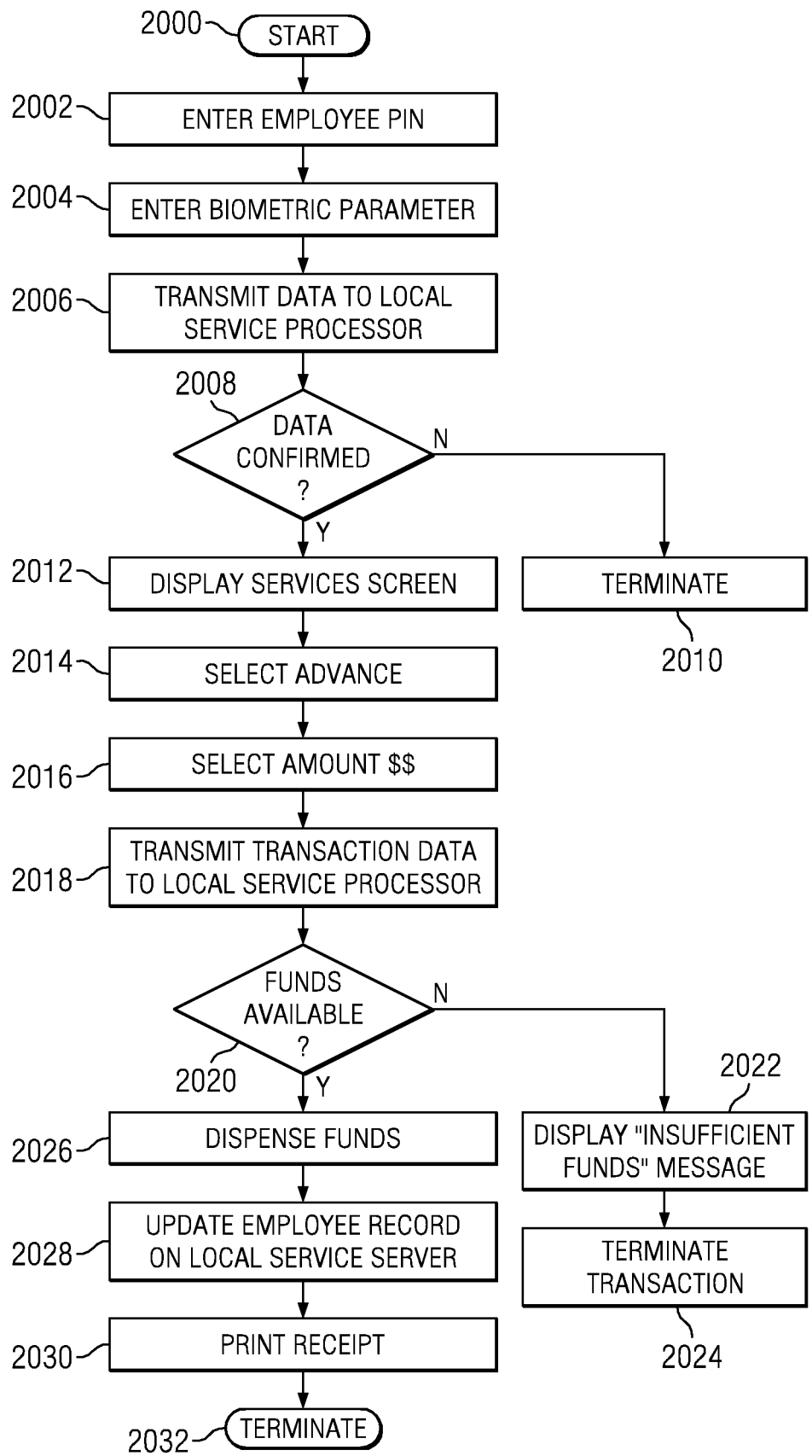
FIG. 20 is a flowchart illustrating a second transaction performed using the system of FIG. 18.

FIG. 20 is a flow diagram illustrating another transaction that may be conducted with system 1800 using an employee's accrued earnings that have not been remitted to the employee. Referring to FIGS. 18 and 20 in conjunction, the process begins at step 2000 when an employee accesses terminal 1810. At steps 2004 and 2006, the employee enters his or her PIN number and/or a biometric parameter. The employee information is transmitted to local service processor 1804 which accesses database 1806 to confirm the employee's status (e.g. currently employed) and identity at step 2006. If the employee's identity and/or status cannot be confirmed at step 2008, the transaction is terminated at step 2010.

Referring still to FIG. 20, at step 2012 the employee may select a service, in this case an advance of funds 2014 based on earnings accrued, but not yet disbursed to the employee. Assuming that the employee's identity is confirmed, at step 2016 a display is presented to the employee whereby the employee may select an amount to be advanced. The screen may also include a fee associated with the advance to enable the employee to terminate the transaction if he or she does not wish to proceed. The transaction data is transmitted to local service processor 1804 at step 2018 and the employee's records are accessed on database 1806 at step 2020 to determine whether the employee has sufficient accrued earnings to allow for the selected advance amount. If the accrued but unpaid earnings are insufficient, e.g. less than the requested advance, or if the requested advance exceeds a predetermined threshold amount, for example 50% of the employee's accrued but unpaid earnings, local service processor 1804 responds to terminal 1810 with an "insufficient funds" or "transaction denied" message which may be displayed to the employee at step 2022 and the transaction terminated at step 2024.

Assuming that the employee has sufficient accrued unpaid earnings, at step 2026, the requested advance is dispensed to the employee. The advance may be dispensed in the form of currency, a money order, a check or a stored value card such as a debit card. The employee's records on database 1806 are then updated to reflect the advance at step 2028 along with a fee for the service. Terminal 1810 may then print or display a receipt for the transaction to the customer at step 2030, after which the transaction is terminated at step 2032. Advances to employees may then be aggregated at predetermined intervals on local service processor 1804 such that the employer may be billed for the advances, (and other charges incurred by employees) at predetermined intervals, typically before the end of the employer's normal pay period so that any advances or charges may be deducted from the employee's accrued earnings before the employee is paid at the end of the pay period, such that the advanced amount can be deducted from the employee's pay for that pay period.

Referring again to FIG. 18, in one embodiment, a portable wireless point of sale device 1824 such as a tablet-type computer may interface with system 1800 to enable employees to purchase items from mobile vendors, for example from food service vendors that typically travel a predetermined route with a truck equipped with food service items with periodic stops along the route. In one embodiment, device 1824 is remotely and dynamically configurable from central office processor 1814 via a wireless interface 1826 to enable or disable services on the device. Device 1824 is configured to interface with local service processor 1804 via a wired or wireless data link 1828. Device 1824 may include a touch screen GUI, a receipt printer, a card reader and similar hardware suitable for use for a portable point of sale device. In this embodiment, it is assumed that system 1800 is operated by a third party that may provide devices 1824 to vendors as well as operating and maintaining local service processor 1804 and database 1806.

Figure 21:
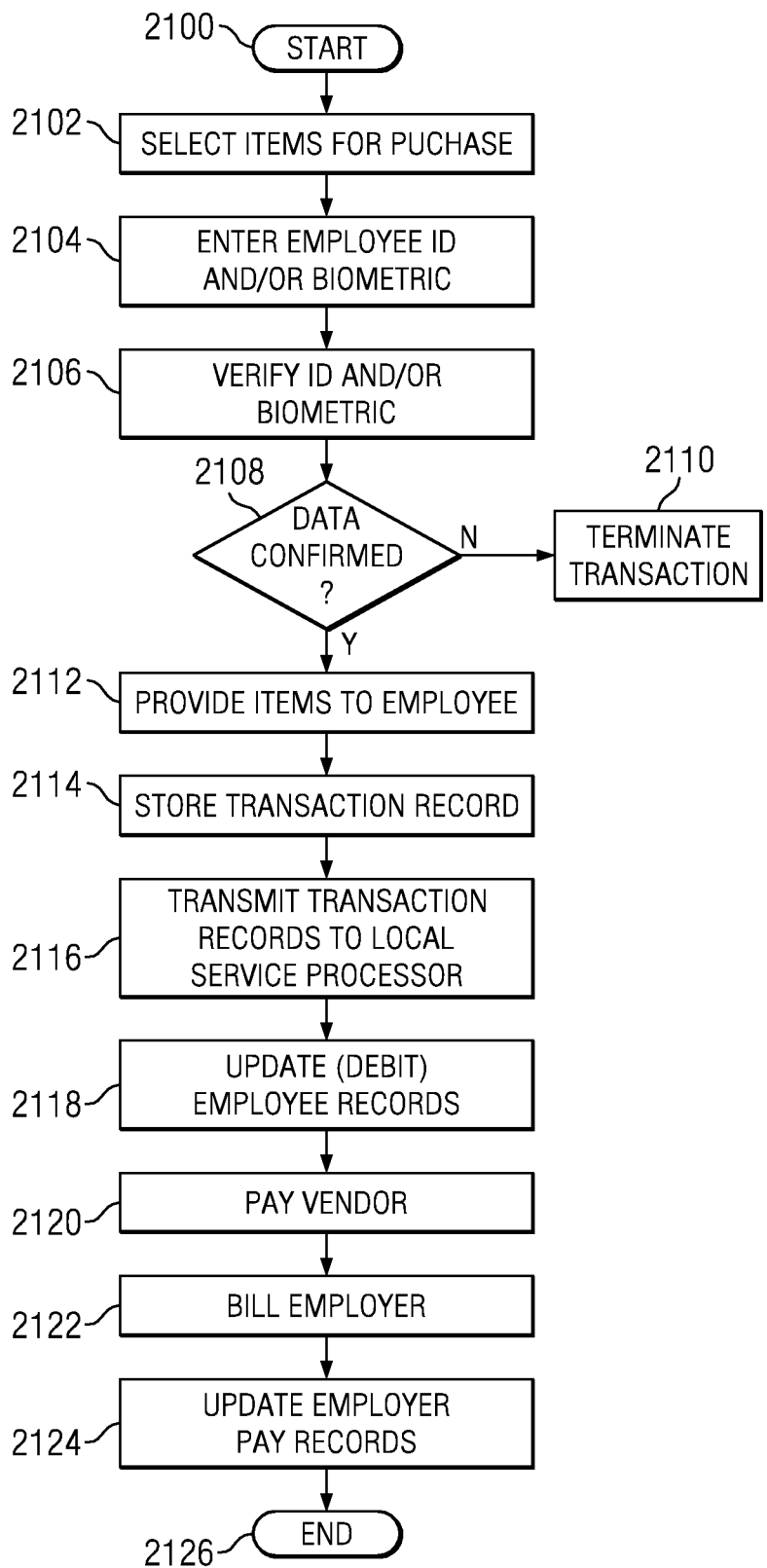
FIG. 21 is a flowchart illustrating a third transaction performed using the system of FIG. 18.

FIG. 21 is a flowchart illustrating a method using a wireless point of sale device with system 1800. The process begins at step 2100 where a mobile vendor operating, for example, a food service catering vehicle, stops at a predetermined location along his or her route in or adjacent to facility 1802. At step 2102, an employee selects food items supplied by the vendor, for example a hamburger and a soft drink. At step 2104, the employee enters a biometric parameter such as a thumb or finger print using device 1824 and/or a PIN number. In the case where only a PIN number is used, it may be entered by the vendor.

At step 2106, device 1824 transmits the employee biometric parameter or PIN to local service processor 1804 to confirm the employee's identity at step 2108. If the employee's identity is not confirmed, the transaction is terminated at step 2110. Depending upon the number of employees serviced by the vendor and the data storage capacity of device 1824, the employee PIN data or biometric parameter of the employee may be stored on the device. In some embodiments it may be desirable to check the employee's accrued earnings balance via wireless interface 1826 with local service processor 1804 depending upon the size of the transaction. In other embodiments, wherein the amount is less than a predetermined threshold, for example $5.00 or $10.00, it may be deemed unnecessary to check the employee's accrued earnings balance.

Referring still to FIG. 21, the purchased items are provided to the employee at step 2112 and a record of the transaction is stored on device 1824. After a predetermined period, for example 4, 8, 12, 24 hours, the aggregated transactions at step 2114 are transmitted to local service processor 1804 at step 2116. (However, this could be a real-time process.) The employee's record of accrued earnings that have not been dispersed are updated at step 2118 on data base 1806. At step 2120, the operator of system 1800 pays the vendor for the items purchased by the employee. The operator of system 1800 then bills the employer for the items purchased by employees at step 2122 after which the employer updates employee pay records by debiting the employee's pay for the pay period with the purchases at step 2124 and the process ends at step 2126.

Device 1824 may also be configured with different service modules to enable employees to conduct transactions other than the purchase of goods. For example, device 1824 may be configured with service modules to allow an employee to pay a utility telephone bill, make a funds deposit or transfer funds utilizing accrued unpaid earnings. Thus, an employee could purchase food items for lunch and then pay his or her telephone bill utilizing services loaded onto device 1824. In these embodiments, the operator of system 1800 will typically charge the employee a nominal fee for providing the services. The fee will be added to an amount debited from the employee's accrued and unpaid earnings along with the cost of the goods or services. In other embodiments, the vendor or recipient of funds advanced against the employee's accrued but unpaid earnings may be charged a fee for the service.

Referring now to FIG. 18A, there is illustrated a diagrammatic view of the system utilizing a PDA, which is a portable terminal in effect. The PDA (Portable Digital Assistant) is designated with a reference numeral 1878. PDA 1878 is a typical stand-alone PDA or a PDA that functions as a telephone. These are sometimes referred to as "smart telephones." They have associated therewith a fairly sophisticated processor that can process various applications in addition to a modem for effecting a voice call. There are a number of different data communication links that can be provided with the PDA 1878. One can be through the data modem that allows access to the phone service provider, or a conventional 802.11 WAP connection could be provided. In the embodiment disclosed within the facility 1802, the WAP connection would be preferred as this provides a connection to a hub 1876 disposed within the facility 1802, which interfaces with an internal network 1880. This internal network 1880 is interfaced with the local service processor 1804. Therefore, through the WAP connection, the PDA 1878 can interface with the local service processor 1804.

PDA 1878 is a device that basically parallels the operation of a terminal with the exception that there are a restricted number of resources. In this embodiment, the resources are a display 1882, which is a touch screen display that can be manipulated with a pointing device 1883, an optical scanner 1884, a fingerprint scanner 1886 and a camera 1888. As such, a user can access all functions associated with the terminal 1810 that require nothing more than a display, a biometric input and possibly an optical scanning input. Additionally, the camera 1888 could be utilized to provide a "face scan" if such were appropriate.

On the PDA 1878, there will be stored various applications. These applications can be downloaded for various functions. One of the applications will be a "terminal" application that emulates one of the terminals 1810. This operates substantially similar to that described hereinabove in that certain service modules, sessions modules/managers, etc., are downloaded to the PDA 1878. When this application is operating on the PDA 1878, the PDA 1878 will be able to provide a heartbeat to the local service processor 1804 to define the availability thereof for updates and the such. Typically, the PDA 1878 will have a fixed configuration that will be associated with the model, etc. Upon initial set-up, the application is loaded and the then the model number of the PDA 1878 is entered to define the overall external resource configuration associated therewith. Thereafter, biometric information can be input to the system in addition to some ID information. This ID information could actually associated with the download such that that every download has a unique ID associated therewith. Thus, when PDA 1878 collects all of the user information, it can then transmit this to the local service processor 1804 (and subsequently to the central office processor 1814, if appropriate) and then periodically contact the local service processor 1804 or central office processor 1814 for updates.

When a session is initiated, the user could access a service module, such as bill pay, and complete a transaction utilizing the display 1882. Another type of transaction utilizing the display could be to transfer money from accrued and unpaid funds to an acquaintance or family member in a different country. In this type of transaction, money would be transferred from the employee's account to a remote location by accessing the funds and then providing a "code" for the transfer. This code would be displayed to the user at the completion of the transaction. Typically, these funds would be transmitted to a company such as Western Union® or some such facility and they would be available for any one that presents the code to a Western Union® office. The code would be displayed on the display at the end of the transaction and then the user can contact a recipient by making a phone call or even emailing such a code to the recipient. In fact, part of the financial transaction could be the emailing operation.

In another transaction, the system may be set up such that a menu item in the company cafeteria could be selected and paid for by the user by first using the optical scanner 1884 to scan some menu to select the items they want to pay for and then completing the transaction, receiving some type of code or confirmation on the display. This code or confirmation could be a number or it could actually be a barcode on the display. The barcode could be presented to a cashier and the cashier could scan this barcode for completion of the transaction.

It will be appreciated by those skilled in the art having the benefit of this disclosure that the transaction system described herein provides a dynamically configurable system including terminals, which may be configured to provide a wide variety of services based on selected criteria. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing, to subscribing employees of the system, access to accrued and unpaid earnings representing unpaid earnings prior to an end of a current pay period, wherein the system is accessed with a system interface, comprising:
   an employer database configured to accrue value for each of the subscribing employees over a current pay period;
   an employer processor configured to determine from the employer database the value of accrued and unpaid earnings for each of the subscribing employees during the current pay period based on an input of time worked during the current pay period;
   a local server including a transaction processor and local server database;
   a communication interface communicating between the employer processor and the transaction processor and transferring data therebetween;
   wherein the transaction processor is configured to:
      request the employer processor to transfer the value of the accrued and unpaid earnings for the subscribing employees from the employer database, and update the local server database with a change in value in the accrued and unpaid earnings at the employer database between a last request during the current pay period and a current request;
      receive a request from a requesting one of the subscribing employees of a transfer of a requested amount of all or part of the accrued and unpaid earnings value stored in the local server database; and
      transfer, via the system interface, value to the requesting one of the subscribing employees in the requested and approved amount.

2. The system of claim 1, wherein the employer database is further configured to accrue value for each of the subscribing employees over a current pay period based on predetermined discreet incremental changes in value as a function of time worked by each of the subscribing employees during the current pay period.

3. The system of claim 1, wherein the communications interface enables download of records of accrued and unpaid earnings for the subscribing employees from the employer processor and database to the transaction processor and the local server database.

4. The system of claim 3, wherein a given one of the subscribing employees uses a wireless communications device to access the transaction processor and the local server database to determine his or her record of accrued and unpaid earnings for a predetermined period.

5. The system of claim 3, wherein the download of the records of accrued and unpaid earnings for the subscribing employees is one of a push type data transfer initiated at predetermined time intervals or a pull type data transfer initiated at predetermined time intervals.

6. The system of claim 1, wherein the request received from the requesting one of the subscribing employees is independent of the request to the employer processor for the value of the accrued and unpaid earning of the subscribing employees for the current pay period.

7. The system of claim 1, wherein the transaction processor is further configured to transmit records of value transferred on behalf of requesting ones of the subscribing employees to the employee processor at predetermined intervals whereupon the employer processor debits the value of accrued and unpaid earnings of subscribing employees on the employer database prior to the end of the current pay period.

8. The system of claim 1, wherein the transaction processor is further configured to:
   compare the requested amount from the requesting one of the subscribing employees with the stored value of the accrued and unpaid earnings of the requesting one of the subscribing employees in the local server database; and
   reduce an amount of the stored value of the accrued and unpaid earnings of the requesting one of the subscribing employees by the requested amount in the local server database as an approved amount by the transaction processor.

9. The system of claim 1, wherein a subscribing employee's accrued and unpaid earnings include earnings due the subscribing employee prior to the end of a payroll period but before the earnings have been disbursed to the subscribing employee.

10. The system of claim 1, wherein a subscribing employee's accrued and unpaid earnings include earnings due the subscribing employee at the end of a payroll period but before the earnings have been disbursed to the subscribing employee.

11. The system of claim 1, wherein a subscribing employee's accrued and unpaid earnings include earnings due the subscribing employee on a predetermined date prior to the end of a payroll period but before the earnings have been disbursed to the subscribing employee.

12. The system of claim 1, further comprising a processing center remote from the local server and wherein the local server includes a communications link enabling the local server to communicate with the processing center to receive and transmit data relating to subscribing employees and third party services available to the subscribing employees.

13. The system of claim 1, further comprising a central office processor remote from the local server, the central office processor interfacing with the local server and with at least one service provider, the central office processor operative with the local server to transfer value on behalf of the requesting one of the subscribing employees in the requested and approved amount to at least one service provider and debit available and unpaid earnings of a given employee on the local server database for the transferred value.

14. The system of claim 1, further comprising an employee access terminal, the employee access terminal including a terminal processor, a communications link with the local server and plurality of physical resources, the employee access terminal operative to receive a request from a requesting one of the subscribing employees of a transfer of a requested amount of all or part of the accrued and unpaid earnings value stored in the local server database and transmit the request to the local server for processing.

15. The system of claim 14, wherein the employee access terminal is operative to display the amount of accrued and unpaid earnings of the requesting one of the subscribing employees for a predetermined time period available to the requesting requesting one of the subscribing employees.

16. The system of claim 14, wherein the plurality of physical resources includes a currency dispenser and wherein the employee access terminal is operative to convey the requested and approved amount to the requesting one of the subscribing employees in a form of currency.

17. The system of claim 14, wherein the employee access terminal is a mobile device.

18. The system of claim 1, wherein the transaction processor is further configured to compare the requested amount of all or part of the accrued and unpaid earnings value stored in the local server database to a predetermined threshold value and limit the approved amount to less than the threshold value.

* * * * *